US012267668B2

(12) United States Patent
Watanabe et al.

(10) Patent No.: US 12,267,668 B2
(45) Date of Patent: Apr. 1, 2025

(54) AUDIO SIGNAL PROCESSING METHOD, AUDIO SIGNAL PROCESSING APPARATUS AND A NON-TRANSITORY COMPUTER-READABLE STORAGE MEDIUM STORING A PROGRAM

(71) Applicant: YAMAHA CORPORATION, Hamamatsu (JP)

(72) Inventors: Takayuki Watanabe, Hamamatsu (JP); Dai Hashimoto, Hamamatsu (JP); Hiroomi Shidoji, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 280 days.

(21) Appl. No.: 17/696,293

(22) Filed: Mar. 16, 2022

(65) Prior Publication Data

US 2022/0303715 A1 Sep. 22, 2022

(30) Foreign Application Priority Data

Mar. 19, 2021 (JP) ................................. 2021-045542

(51) Int. Cl.
*H04S 7/00* (2006.01)
*H04R 5/02* (2006.01)
*H04R 5/04* (2006.01)

(52) U.S. Cl.
CPC ............... *H04S 7/308* (2013.01); *H04R 5/02* (2013.01); *H04R 5/04* (2013.01); *H04S 7/305* (2013.01);
(Continued)

(58) Field of Classification Search
CPC ...... H04S 7/308; H04S 7/305; H04S 2400/11; H04S 2400/13; H04S 7/40;
(Continued)

(56) References Cited

U.S. PATENT DOCUMENTS

2017/0238119 A1 8/2017 Schlecht et al.
2018/0060025 A1 3/2018 Hill et al.
(Continued)

FOREIGN PATENT DOCUMENTS

WO 2012147196 A1 11/2012
WO 2016208406 A1 12/2016
WO WO 2021067183 * 3/2019 ............... H04S 7/00

OTHER PUBLICATIONS

Extended European Search Report issued in European Appln. No. 23202927.2 mailed Jan. 23, 2024.
Extended European Search Report issued in European Appln. No. 23202922.3 mailed Jan. 22, 2024.
Office Action issued in European Appln. No. 22162885.2 mailed on Aug. 26, 2022.
Vorlander "Chapter 11 Simulation of Sound in rooms" Auralization: Fundamentals of acoustics, modelling, simulation, algorithms and acoustic virtual reality. Oct. 26, 2007: pp. 1-52. Cited in NPL 1.
(Continued)

*Primary Examiner* — Yosef K Laekemariam
(74) *Attorney, Agent, or Firm* — ROSSI, KIMMS & McDOWELL LLP

(57) ABSTRACT

An audio signal processing method includes dividing a virtual sound source representing a reflected sound of a target acoustic space into (i) a first virtual sound source located between a position of a speaker and a position of a sound receiving point, the first virtual sound source representing a first sound source of the reflected sound of the target acoustic space, and (ii) a second virtual sound source located such that the speaker is disposed between the second virtual sound source and the sound receiving point, the second virtual sound source representing a second sound source of the reflected sound of the target acoustic space, and, only in a case of the first virtual sound source, moving a position of the first virtual sound source to a reproducible position based on a position of the speaker.

6 Claims, 32 Drawing Sheets

(52) U.S. Cl.
CPC ....... *H04S 2400/11* (2013.01); *H04S 2400/13* (2013.01)

(58) Field of Classification Search
CPC ...... H04S 2420/01; H04S 7/302; H04S 7/303; H04S 7/00; H04R 5/02; H04R 5/04; H04R 1/345
See application file for complete search history.

(56) References Cited

U.S. PATENT DOCUMENTS

2018/0160250 A1 6/2018 Yamamoto
2023/0011357 A1 * 1/2023 Osako ..................... H04S 7/303

OTHER PUBLICATIONS

Partial European Search Report issued in European Appln. No. 22162885.2 mailed Dec. 9, 2022.
Savioja. "Creating Interactive Virtual Acoustic Environments" J. Audio Eng. Soc., Sep. 1999. pp. 675-705, vol. 47, No. 9. Cited in NPL 1.
Lee. "Sound Field Processor for Creating Virtual Concert Hall Impression in Home" IEEE Transactions on Consumer Electronics. May 1995. pp. 273-281, vol. 41, No. 2. Cited in NPL 1.
Office Action issued in Chinese Appln. No. 202210248168.9, mailed on Dec. 26, 2024. English machine translation provided.

* cited by examiner

AUDIO SIGNAL PROCESSING METHOD, AUDIO SIGNAL PROCESSING APPARATUS AND A NON-TRANSITORY COMPUTER-READABLE STORAGE MEDIUM STORING A PROGRAM

CROSS REFERENCE TO RELATED APPLICATIONS

This Nonprovisional application claims priority under 35 U.S.C. § 119(a) on Patent Application No. 2021-045542 filed in Japan on Mar. 19, 2021, the entire contents of which are hereby incorporated by reference.

BACKGROUND

Technical Field

An embodiment of the present disclosure relates to an audio signal processing method and an audio signal processing apparatus that perform predetermined processing on a sound to be inputted from a sound source.

Background Information

In an acoustic system to a space such as a hall or the like, a speaker disposed in the space localizes a sound image to a sound source.

For example, a sound processing apparatus disclosed in International Publication No. 2016/208406 outputs a sound of an audio object (a sound source) by two or more speakers near the audio object (the sound source). In such a case, the sound processing apparatus disclosed in International Publication No. 2016/208406 calculates a gain of an audio signal to be outputted to each speaker by use of position information and sound image information on the audio object (the sound source).

However, with the above conventional configuration, sound image localization in a virtual space is not be able to clearly reproduced in a space in which a speaker is installed.

SUMMARY

In view of the foregoing, an object of an embodiment of the present disclosure is to clearly reproduce sound image localization in a virtual space.

An audio signal processing method includes dividing a virtual sound source representing a reflected sound of a target acoustic space into (i) a first virtual sound source located between a position of a speaker and a position of a sound receiving point, the first virtual sound source representing a first sound source of the reflected sound of the target acoustic space, and (ii) a second virtual sound source located such that the speaker is disposed between the second virtual sound source and the sound receiving point, the second virtual sound source representing a second sound source of the reflected sound of the target acoustic space, and, only in a case of the first virtual sound source, moving a position of the first virtual sound source to a reproducible position based on the position of the speaker.

An audio signal processing method is able to clearly reproduce sound image localization in a virtual space.

DETAILED DESCRIPTION

An audio signal processing method and an audio signal processing apparatus according to an embodiment of the present disclosure will be described with reference to the drawings. The following embodiments first describe an outline of the audio signal processing method and the audio signal processing apparatus. Subsequently, specific content of each processing and each configuration will be described.

In the present embodiment, a reproduction space is a space in which a user (a listener) listens to a sound (a direct sound, an initial reflected sound, and a reverberant sound) from a sound source, by use of a speaker or the like. A virtual space is a space that has a sound field (acoustics) different from the reproduction space, and is a space in which an initial reflected sound and a reverberant sound are to be reproduced (simulated) in the reproduction space.

[Schematic Configuration of Audio Signal Processing Apparatus]

Figure 1:
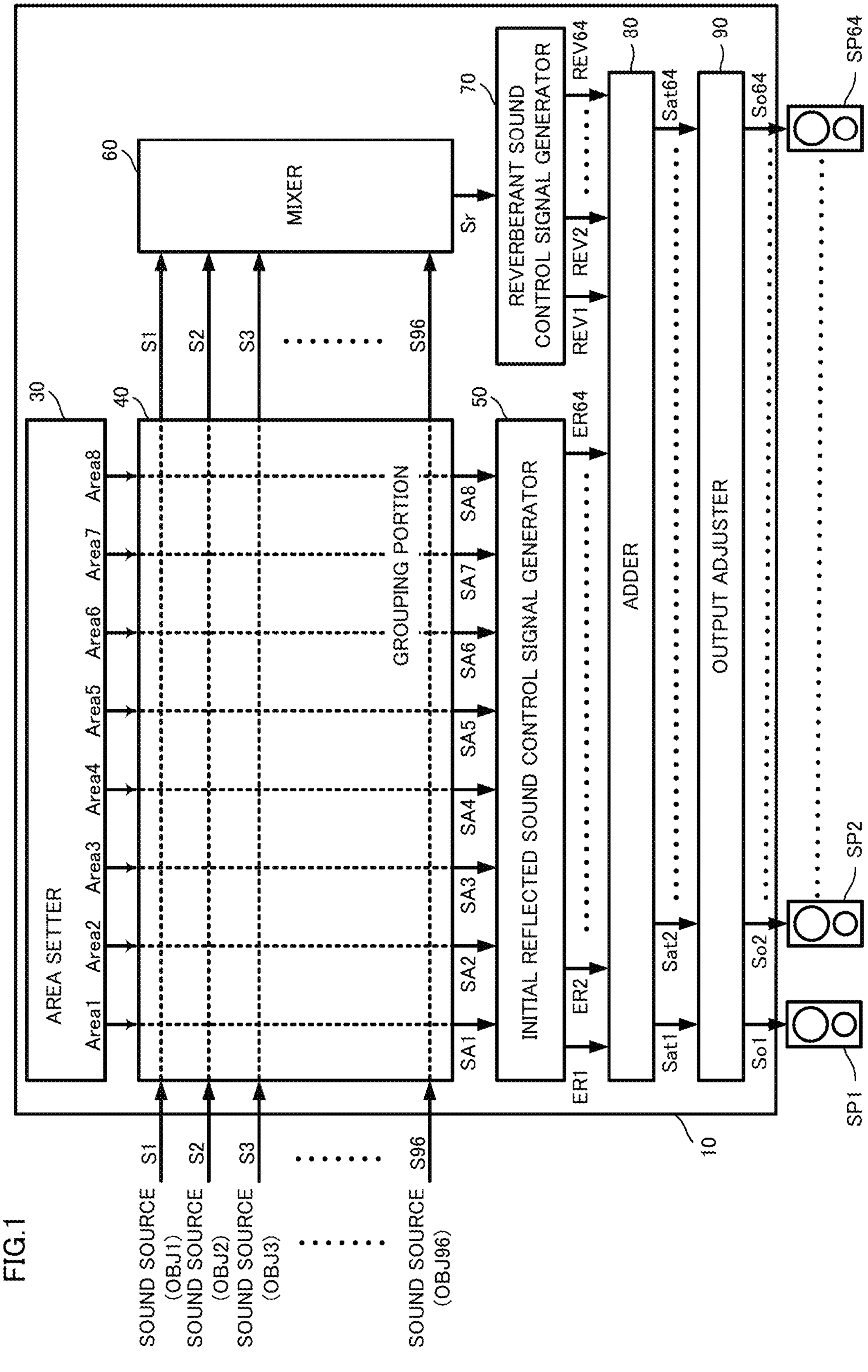
FIG. 1 is a functional block diagram showing a configuration of an acoustic system including an audio signal processing apparatus according to an embodiment of the present disclosure.

FIG. 1 is a functional block diagram showing a configuration of an acoustic system including an audio signal processing apparatus according to an embodiment of the present disclosure.

As shown in FIG. 1, an audio signal processing apparatus 10 includes an area setter 30, a grouping portion 40, an initial reflected sound control signal generator 50, a mixer 60, a reverberant sound control signal generator 70, an adder 80, and an output adjuster 90. The audio signal processing apparatus 10 is implemented, for example, by an electronic circuit that implements each of the area setter 30, the grouping portion 40, the initial reflected sound control signal generator 50, the mixer 60, the reverberant sound control signal generator 70, the adder 80, and the output adjuster 90, or an arithmetic processing apparatus such as a computer. A portion to be configured by the adder 80 and the output adjuster 90 corresponds to an "output signal generator" of the present disclosure.

The audio signal processing apparatus 10 is connected to a plurality of speakers SP1 to SP64. It is to be noted that, while FIG. 1 shows an aspect in which 64 speakers are used, the number of speakers is not limited to this aspect.

Audio signals S1 to S96 of a plurality of sound sources OBJ1 to OBJ96 are inputted to the audio signal processing apparatus 10. It is to be noted that, while FIG. 1 shows an aspect in which 96 sound sources are used, the number of sound sources is not limited to this aspect.

The area setter 30 divides the reproduction space into a plurality of areas, and sets information (area information) relating to a divided area. The area information is a position coordinate that determines a boundary of areas, and a position coordinate of a representative point set to the area.

The area setter 30 outputs the area information on a plurality of set areas Area1 to Area8, to the grouping portion 40. It is to be noted that, while FIG. 1 shows an aspect in which eight areas are set, the number of areas is not limited to this aspect.

The grouping portion 40 groups the sound sources OBJ1 to OBJ96 for the plurality of areas Area1 to Area8. The grouping portion 40, based on a grouping result, generates area-specific audio signals SA1 to SA8 for each area Area1 to Area8 by use of the audio signals S1 to S96 of the sound sources OBJ1 to OBJ96. For example, the grouping portion 40 mixes audio signals of a plurality of sound sources grouped for the area Area1, and generates an area-specific audio signal SA1.

The grouping portion 40 outputs the plurality of area-specific audio signals SA1 to SA8, to the initial reflected sound control signal generator 50. In addition, the grouping portion 40 outputs the audio signals S1 to S96 of the sound sources OBJ1 to OBJ96, to the mixer 60.

The initial reflected sound control signal generator 50 generates initial reflected sound control signals ER1 to ER64 for each of a plurality of speakers SP1 to SP64, from the plurality of area-specific audio signals SA1 to SA8. The initial reflected sound control signals ER1 to ER64 are signals to be outputted to each of the speakers SP1 to SP64 in order to simulate an initial reflected sound in the virtual space, in the reproduction space. The initial reflected sound control signal generator 50 outputs the generated initial reflected sound control signals ER1 to ER64, to the adder 80.

Schematically (the detailed configuration and processing will be described below), the initial reflected sound control signal generator 50 sets an imaginary sound source (a virtual sound source) in the reproduction space by use of a position of the speakers SP1 to SP64 that are disposed in the reproduction space and a geometrical shape of the virtual space. It is to be noted that a specific setting of the imaginary sound source will be described below. The initial reflected sound control signal generator 50 uses the imaginary sound source, and generates the initial reflected sound control signals ER1 to ER64 that simulate the initial reflected sound in the virtual space. In such a case, the initial reflected sound control signal generator 50 performs desired tone adjustment to the initial reflected sound control signals ER1 to ER64.

The mixer 60 is a summing mixer. The mixer 60 mixes the audio signals S1 to S96 of the sound sources OBJ1 to OBJ96, and generates a reverberant sound generation signal Sr. The mixer 60 outputs the reverberant sound generation signal Sr to the reverberant sound control signal generator 70.

The reverberant sound control signal generator 70 generates reverberant sound control signals REV1 to REV64 for each of the plurality of speakers SP1 to SP64, from the reverberant sound generation signal Sr. The reverberant sound control signals REV1 to REV64 are signals to be outputted to each of the speakers SP1 to SP64 in order to simulate the reverberant sound (the rear reverberant sound) in the virtual space, in the reproduction space. The reverberant sound control signal generator 70 outputs the generated reverberant sound control signals REV1 to REV64, to the adder 80.

Schematically (the detailed configuration and processing will be described below), the reverberant sound control signal generator 70 divides the reproduction space into a plurality of reverberant sound setting areas, and generates a reverberant sound control signal for each of the plurality of reverberant sound setting areas. The reverberant sound control signal generator 70 assigns the plurality of speakers SP1 to SP64 to the plurality of reverberant sound setting areas. The reverberant sound control signal generator 70, based on this assignment, sets the reverberant sound control signal for each reverberant sound setting area to the plurality of speakers SP1 to SP64.

In such a case, the reverberant sound control signal generator 70 sets timing of connection between an initial reflected sound and a reverberant sound, based on the geometrical shape of the reproduction space. The reverberant sound control signal generator 70 gradually increases a level (an amplitude) of the reverberant sound control signal in a period before the timing of connection, and gradually reduces the level (the amplitude) of the reverberant sound control signal in a period after the timing of connection.

The adder 80 adds the initial reflected sound control signal and the reverberant sound control signal that have been generated for each of the plurality of speakers SP1 to SP64, and generates a plurality of speaker signals Sat1 to Sat64. For example, the adder 80 adds the initial reflected sound control signal for a speaker SP1, and the reverberant sound control signal for the speaker SP1, and generates a speaker signal Sat1. The adder 80 outputs the plurality of speaker signals Sat1 to Sat64 to the output adjuster 90.

The output adjuster 90 performs gain control and delay control on the plurality of speaker signals Sat1 to Sat64, and generates output signals So1 to So64. The output adjuster 90 outputs the output signals So1 to So64 to the plurality of speakers SP1 to SP64. For example, the output adjuster 90 performs gain control and delay control for the speaker SP1 on the speaker signal Sat1, and generates an output signal So1. The output adjuster 90 outputs the output signal So1 to the speaker SP1.

Schematically (the detailed configuration and processing will be described below), the output adjuster 90 receives an input of an acoustic parameter in the reproduction space. The acoustic parameter, for example, is a parameter that sets adjustment to spatial expansion of a space in a width direction of a sound space, adjustment to spatial expansion behind a sound receiving point in the sound space, and adjustment to spatial expansion in a ceiling direction of the sound space. The output adjuster 90, based on a plurality of position coordinates of the plurality of speakers SP1 to SP64 and the acoustic parameter, collectively sets a gain value and a delay quantity (delay amount) of the plurality of speaker signals Sat1 to Sat64. The collectively setting does not mean setting each speaker individually, but means setting a gain value and a delay amount for each speaker by simply inputting a position coordinate of each speaker into a specific calculation formula common to all the speakers, for example. The output adjuster 90 performs the gain control and the delay control on the plurality of speaker signals Sat1 to Sat64 by use of the set gain value and delay value.

[Schematic Processing of Audio Signal Processing Method]

Figure 2:
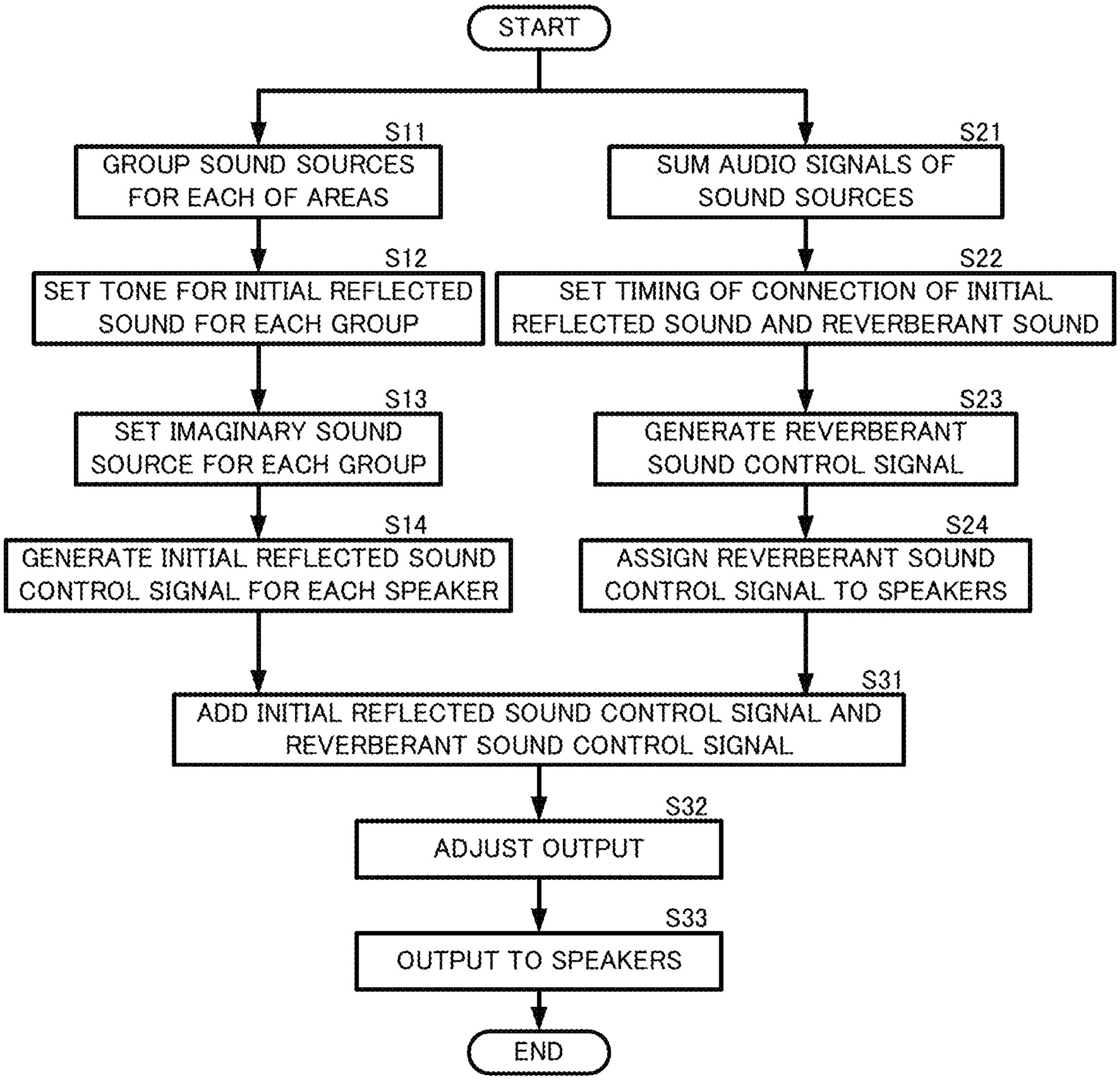
FIG. 2 is a flow chart of an audio signal processing method according to an embodiment of the present disclosure.

FIG. 2 is a flow chart of an audio signal processing method according to an embodiment of the present disclosure. FIG. 2 shows the audio signal processing method to be implemented by the audio signal processing apparatus 10 of FIG. 1. It is to be noted that the content of each processing shown in FIG. 2, since having been described in a description of FIG. 1, will be described in a simplified manner.

(Grouping of Sound Sources OBJ1 to OBJ96)

The grouping portion 40 groups the plurality of sound sources OBJ1 to OBJ96 for each of the plurality of areas Area1 to Area8 (S11).

(Generation of Initial Reflected Sound Control Signal)

The initial reflected sound control signal generator 50 sets a tone for the initial reflected sound for each group (S12). The initial reflected sound control signal generator 50 sets an imaginary sound source for each group (S13). The initial reflected sound control signal generator 50 generates an initial reflected sound control signal for each of the plurality of speakers SP1 to SP64 by use of the tone and the imaginary sound source (S14).

(Generation of Reverberant Sound Control Signal)

The mixer 60 sums the audio signals S1 to S96 of the plurality of sound sources OBJ1 to OBJ96 (S21). The reverberant sound control signal generator 70 sets timing of connection between the initial reflected sound and the reverberant sound, based on the geometrical shape of the reproduction space (S22). The reverberant sound control signal generator 70 generates a reverberant sound control signal by use of the set timing of connection (S23). The reverberant sound control signal generator 70 assigns the generated reverberant sound control signal to the plurality of speakers SP1 to SP64, based on the position coordinates of the plurality of speakers SP1 to SP64 in the reproduction space (S24).

(Output Processing to Speakers)

The adder 80 adds the initial reflected sound control signal and the reverberant sound control signal for each of the plurality of speakers SP1 to SP64, and generates the speaker signals Sat1 to Sat64 (S31).

The output adjuster 90 generates the output signals So1 to So64 from the speaker signals Sat1 to Sat64 by use of the acoustic parameter that implements reverberation localization and spatial expansion in the reproduction space (S32). The output adjuster 90 outputs the output signals So1 to So64 to the plurality of speakers SP1 to SP64 (S33).

By using the above configuration and processing, the audio signal processing apparatus (the audio signal processing method) 10 is able to obtain various types of effects as follows.

(1) The audio signal processing apparatus (the audio signal processing method) 10 groups sound sources for each area obtained by dividing the reproduction space and generates an initial reflected sound, and thus is able to obtain clear sound image localization and rich spatial expansion. In such a case, the reverberant sound is constant in the entire reproduction space, and only the initial reflected sound changes depending on the position of a sound source. Therefore, for example, in a case in which the position of a sound source moves, movement of the sound of this sound source becomes smoother.

(2) The audio signal processing apparatus (the audio signal processing method) 10 generates an initial reflected sound control signal by use of an imaginary sound source, and thus is able to more accurately simulate the initial reflected sound by the geometrical shape of the virtual space, in the reproduction space.

(3) The audio signal processing apparatus (the audio signal processing method) 10 performs tone adjustment to the initial reflected sound control signal, and thus is able to eliminate the unnatural tone of the initial reflected sound to be simulated by only the imaginary sound source, for example.

(4) The audio signal processing apparatus (the audio signal processing method) 10 sets timing of connection between the initial reflected sound control signal and the reverberant sound control signal from the geometrical shape of the reproduction space, and thus is able to make connection from the initial reflected sound to the reverberant sound smoother and more natural.

(5) The audio signal processing apparatus (the audio signal processing method) 10 collectively adjusts the gain value and the delay amount of the speaker signals Sat1 to Sat64 including the initial reflected sound control signal and the reverberant sound control signal, and thus is able to obtain a sound field that a user desires in the reproduction space through a simpler operation input.

[Specific Description of Each Signal Processor and of Each Processing]

Hereinafter, a specific description of each signal processor and each processing described above will be described. First, an initial reflected sound, a reverberant sound, and an imaginary sound source that are required to understand the present disclosure will be described with reference to the drawings.

[Initial Reflected Sound and Reverberant Sound]

Figure 3:
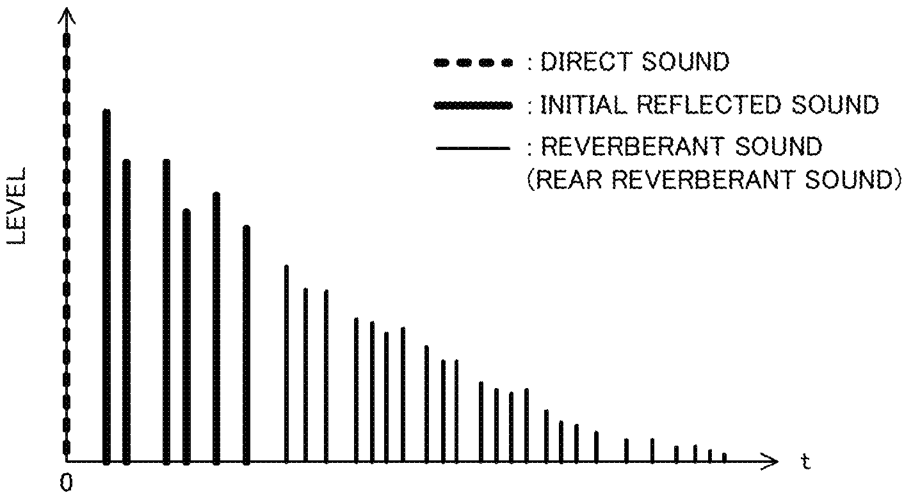
FIG. 3 is a view showing a discrete waveform of a sound including a general direct sound, initial reflected sound, and reverberant sound (rear reverberant sound).

FIG. 3 is a view showing a discrete waveform of a sound including a general direct sound, initial reflected sound, and reverberant sound (rear reverberant sound). For example, a hall in which performance and content are reproduced has an enclosed space surrounded by a wall. When a sound is generated in this enclosed space, a direct sound, an initial reflected sound, and a reverberant sound (a rear reverberant sound) reach a sound receiving point.

The direct sound is a sound that directly reaches the sound receiving point from a generation position of the sound.

The initial reflected sound is a sound that reaches the sound receiving point at an early time after the sound generated at the generation position is reflected on a wall, a floor, and a ceiling. Therefore, the initial reflected sound reaches the sound receiving point following the direct sound. In addition, volume (a level) of the initial reflected sound is smaller than volume (a level) of the direct sound. One reflection provides a primary reflected sound, and the n reflections provide an n-th reflected sound. An arrival direction and volume of the initial reflected sound at the sound receiving point are greatly affected by the generation position of the sound.

The reverberant sound reaches the sound receiving point following the initial reflected sound. The reverberant sound is a sound that reaches the sound receiving point after the sound generated at the generation position is reflected multiple times. In other words, the reverberant sound is a sound that reaches the sound receiving point while a reflected sound is further reflected and attenuated multiple times. Therefore, the volume (the level) of the reverberant sound is smaller than the volume (the level) of the initial reflected sound. Furthermore, the influence of the generation position of the sound on the arrival direction of a reverberant sound and the volume of the reverberant sound is smaller than the influence of the initial reflected sound.

[Imaginary Sound Source]

Figure 4A:
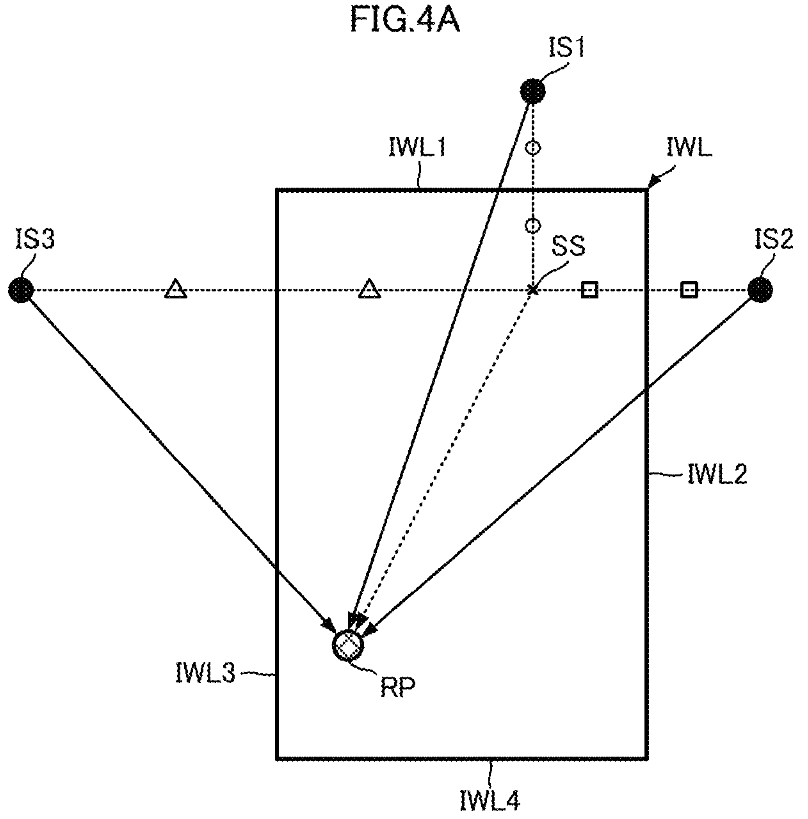
FIG. 4A and FIG. 4B are views showing a setting concept of an imaginary sound source.
Figure 4B:
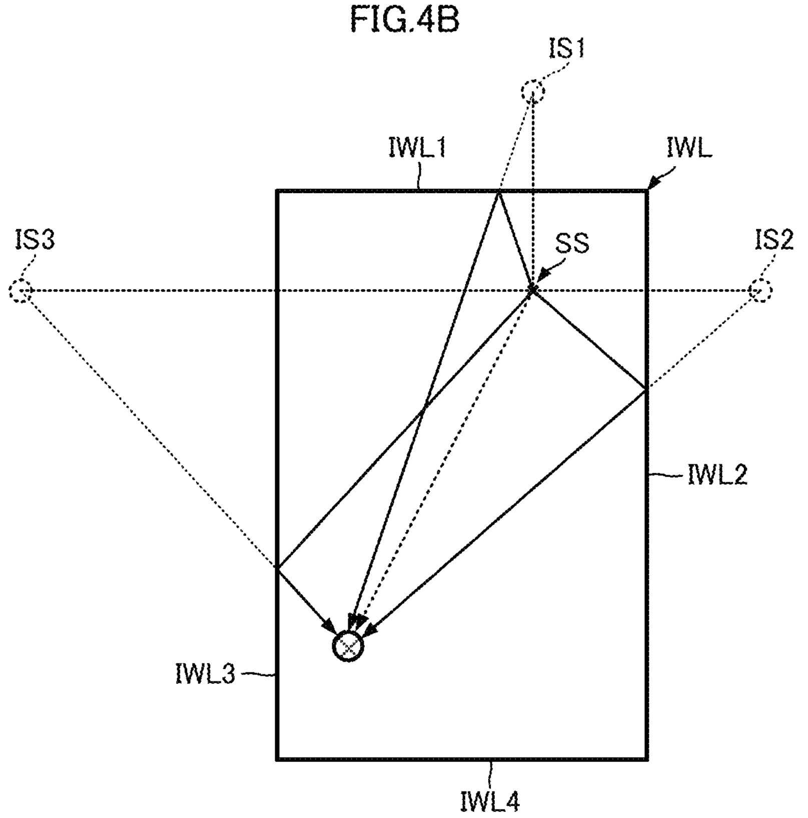

FIG. 4A and FIG. 4B are views showing a setting concept of an imaginary sound source. It is to be noted that FIG. 4A and FIG. 4B show the setting concept of the imaginary sound source in two dimensions in order to make a description easy, but the imaginary sound source is able to be set with the same concept in three dimensions. In other words, in an actual reproduction space, in a case in which sound sources are not aligned on a single plane, but are spatially arranged, and the virtual space is set in three dimensions, the imaginary sound source is set in three dimensions.

A sound source SS and a sound receiving point RP are located in the reproduction space. It is to be noted that the sound source SS shown in FIG. 4A and FIG. 4B is different from the sound source OBJ in the above description, and means a source from which a general sound is generated. In addition, a virtual wall IWL that implements a sound field in the virtual space is set in the reproduction space. The virtual wall IWL is obtained from the geometrical shape of the virtual space.

The sound source SS and the sound receiving point RP are located in a space surrounded by the virtual wall IWL. The virtual wall IWL includes a virtual wall IWL1, a virtual wall IWL2, a virtual wall IWL3, and a virtual wall IWL4. The virtual wall IWL1 and the virtual wall IWL4 are disposed so as to interpose the sound source SS and the sound receiving point RP in a first direction (a vertical direction in FIG. 4A and FIG. 4B) of the reproduction space. The virtual wall IWL1 is disposed closer to the sound source SS than to the sound receiving point RP, and the virtual wall IWL4 is disposed closer to the sound receiving point RP than to the sound source SS. The virtual wall IWL2 and the virtual wall IWL3 are disposed so as to interpose the sound source SS and the sound receiving point RP in a second direction (a lateral direction in FIG. 4A and FIG. 4B) of the reproduction space. The virtual wall IWL2 is disposed closer to the sound source SS than to the sound receiving point RP, and the virtual wall IWL3 is disposed closer to the sound receiving point RP than to the sound source SS.

When the virtual wall IWL1, the virtual wall IWL2, the virtual wall IWL3, and the virtual wall IWL4 are walls that actually reflect a sound, as shown in FIG. 4B, the sound emitted from the sound source SS is reflected on the virtual wall IWL1, the virtual wall IWL2, and the virtual wall IWL3, and reaches the sound receiving point RP. It is to be noted that, although reflection by the virtual wall IWL4 is not described in FIG. 4B, reflection also occurs in the virtual wall IWL4 as with the virtual wall IWL1, the virtual wall IWL2, and the virtual wall IWL3.

However, the virtual wall IWL1, the virtual wall IWL2, the virtual wall IWL3, and the virtual wall IWL4 do not exist in reality in the reproduction space. Therefore, as shown in FIG. 4A, the audio signal processing apparatus 10 sets an imaginary sound source IS1, an imaginary sound source IS2, and an imaginary sound source IS3 by using sound reflection on a surface of a wall as specular reflection.

Specifically, the audio signal processing apparatus 10 sets the imaginary sound source IS1 at a position in line symmetry to the sound source SS, using the virtual wall IWL1 as a reference line. The audio signal processing apparatus 10 sets the imaginary sound source IS2 at a position in line symmetry to the sound source SS, using the virtual wall IWL2 as a reference line. The audio signal processing apparatus 10 sets the imaginary sound source IS3 at a position in line symmetry to the sound source SS, using the virtual wall IWL3 as a reference line. It is to be noted that energy loss in reflection on the virtual wall IWL is able to be simulated by adjusting acoustic power of each imaginary sound source IS.

With such a setting, a sound generated by the imaginary sound source IS1 is the same as the sound generated by the sound source SS and reflected on the virtual wall IW1. A sound generated by the imaginary sound source IS2 is the same as the sound generated by the sound source SS and reflected on the virtual wall IW2. A sound generated by the imaginary sound source IS3 is the same as the sound generated by the sound source SS and reflected on the virtual wall IW3. It is to be noted that, although an imaginary sound source with respect to the virtual wall IWL4 is not described in FIG. 4A and FIG. 4B, an imaginary sound source is also able to be set on the virtual wall IWL4 as with the virtual wall IWL1, the virtual wall IWL2, and the virtual wall IWL3.

The audio signal processing apparatus 10 sets an imaginary sound source as described above, and thus is able to simulate an initial reflected sound in the virtual space, in the reproduction space in which an actual wall of the virtual space does not exist.

[Configuration and Processing of Grouping portion 40]

Figure 5:
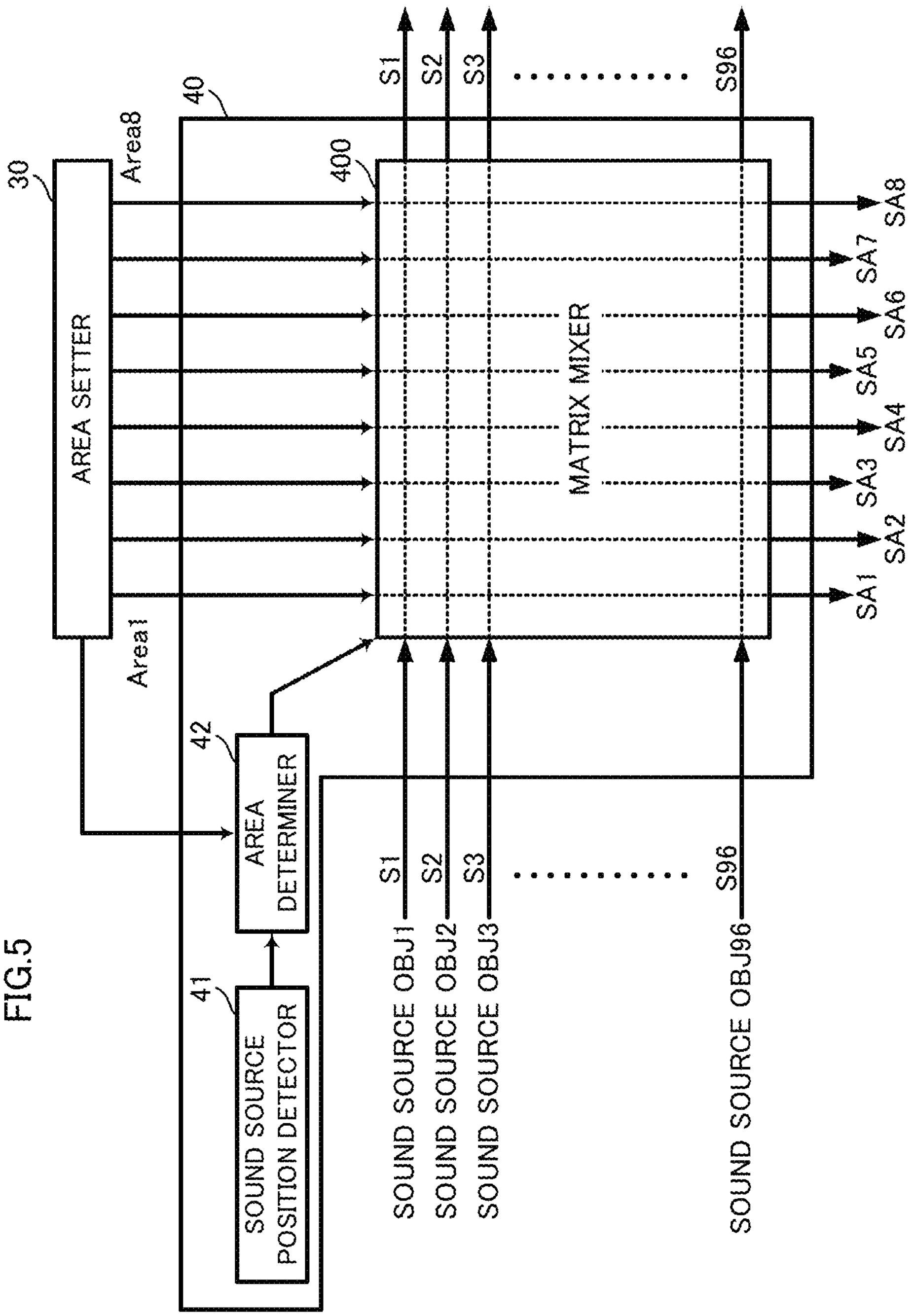
FIG. 5 is a functional block diagram showing an example of a configuration of a grouping portion.
Figure 6:
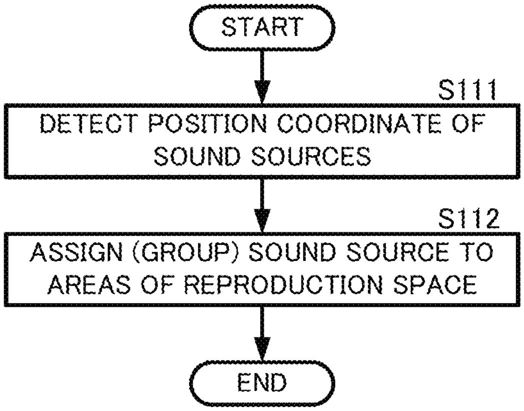
FIG. 6 is a flow chart showing a sound source grouping method.

FIG. 5 is a functional block diagram showing an example of a configuration of a grouping portion 40. FIG. 6 is a flow chart showing a sound source grouping method.

As shown in FIG. 5, the grouping portion 40 includes a sound source position detector 41, an area determiner 42, and a matrix mixer 400.

The sound source position detector 41 detects a position coordinate of the plurality of sound sources OBJ1 to OBJ96 in the reproduction space (S111 in FIG. 6). For example, the sound source position detector 41 detects the position coordinate of the sound sources OBJ1 to OBJ96 by an operation input from a user. Alternatively, the sound source position detector 41 includes a position detection sensor to detect the sound sources OBJ1 to OBJ96, and detects the position coordinate of the sound sources OBJ1 to OBJ96 by a position that the position detection sensor has detected.

The sound source position detector 41 outputs the position coordinate of the sound sources OBJ1 to OBJ96 to the area determiner 42.

The area determiner 42 groups the sound sources OBJ1 to OBJ96 for the plurality of areas Area1 to Area8 by use of the area information on the plurality of areas Area1 to Area8 from the area setter 30 and the position coordinate of the sound sources OBJ1 to OBJ96 from the sound source position detector 41 (S112 in FIG. 6). More specifically, the area determiner 42 performs grouping as follows.

Figure 7:
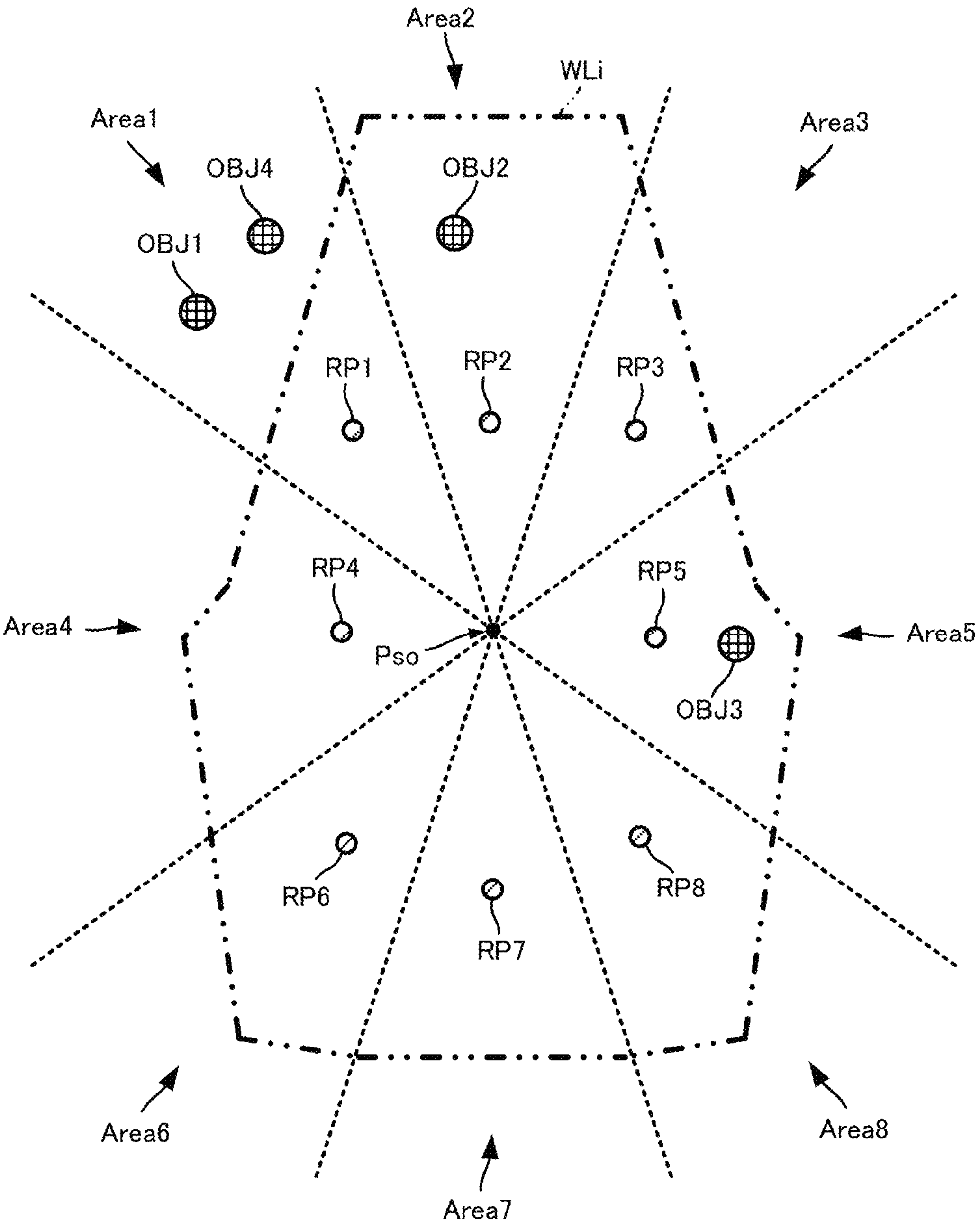
FIG. 7 is a view showing a concept of grouping a plurality of sound sources for a plurality of areas.

FIG. 7 is a view showing a concept of grouping a plurality of sound sources for a plurality of areas. It is to be noted that, in FIG. 7, the upper part of the figure is the front of a hall being the reproduction space, and the lower part of the figure is the rear of the hall.

The area setter 30 sets a reference point Pso for area division, with respect to the reproduction space. For example, as shown in FIG. 7, the area setter 30 sets a center position of the hall that provides the reproduction space as the reference point Pso. It is to be noted that the area setter 30 is also able to set a point (a position) that a user has set, as a reference point. For example, the area setter 30 is able to set a sound receiving point or the like that a user has set, as a reference point.

The area setter 30 sets the eight areas Area1 to Area8 so as to divide all circumferences on the plane into eight, with the reference point Pso for area division as a center. For example, in a case of FIG. 7, the area setter 30 sets the plurality of areas Area1, Area2, and Area3 in front of the reference point Pso in the hall (the reproduction space). In addition, the area setter 30 sets the area Area4 in a left direction, facing the front of the hall from the reference point Pso, and sets the area Area5 in a right direction, facing the front of the hall from the reference point Pso. In addition, the area setter 30 sets a plurality of areas Area6, Area1, and Area8 in the rear of the reference point Pso in the hall (the reproduction space).

It is to be noted that the setting of this area is just one example, and any setting may be used as long as the entire reproduction space is able to be covered by a plurality of set areas. In addition, while this description shows the setting for a planar area, a spatial area is able to be set similarly. For example, a portion in the vertical direction of the area Area1 is also included in the area Area1.

The area setter 30 respectively sets representative points RP1 to RP8 to the plurality of areas Area1 to Area8. For example, the area setter 30 sets the plurality of representative points RP1 to RP8 in the center position of the plurality of areas Area1 to Area8. Alternatively, in a case of a radially expanded area as shown in FIG. 7, for example, the area setter 30 sets a representative point at a position at a predetermined distance from the reference point Pso, on a straight line passing through the center of a radially expanded angle. It is to be noted that a method of setting these representative points is just one example, and, for example, any method may be used as long as one representative point is able to be set in one area and grouping processing of sound sources is reliably performed.

The area setter 30 outputs the area information on the plurality of areas Area1 to Area8 to the area determiner 42 and the matrix mixer 400 of the grouping portion 40. The area information on the plurality of areas Area1 to Area8 includes position coordinates of the representative points RP1 to RP8 of the areas Area1 to Area8, and coordinate information indicating a boundary line that forms a shape of the areas Area1 to Area8.

(Method of Grouping Sound Sources in Areas Using Representative Point)

Figure 8A:
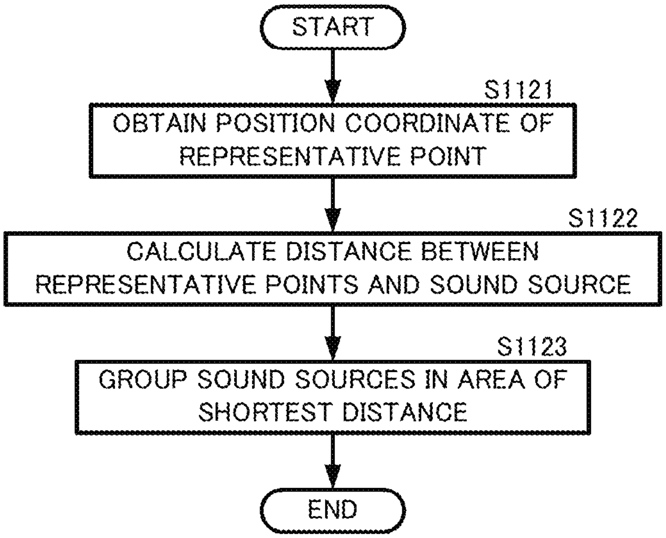
FIG. 8A is a flow chart showing a sound source grouping method using a representative point.

FIG. 8A is a flow chart showing a sound source grouping method using a representative point.

The area determiner 42 obtains the position coordinate of the representative points RP1 to RP8 from the area information on the plurality of areas Area1 to Area8 (S1121). The area determiner 42 calculates a distance between the position coordinate of the sound sources to be determined for grouping and the position coordinate of the representative points RP1 to RP8 (S1122). The area determiner 42 groups the sound sources in an area including a representative point of the shortest distance (S1123).

For example, in a case of the sound source OBJ1 in the example of FIG. 7, the area determiner 42 detects a position coordinate of the sound source OBJ1, and obtains the position coordinate of the plurality of representative points RP1 to RP8. The area determiner 42 calculates a distance between the sound source OBJ1 and each of the plurality of representative points RP1 to RP8 from the position coordinate of the sound source OBJ1 and the position coordinate of the plurality of representative points RP1 to RP8. The area determiner 42 detects that the distance between the sound source OBJ1 and the representative point RP1 is shorter than the distance between the sound source OBJ1 and other representative points RP2 to RP8. In other words, the area determiner 42 detects that the distance between the sound source OBJ1 and the representative point RP1 is the shortest distance. The area determiner 42 groups the sound source OBJ1 in the area Area1 linked to the representative point RP1.

(Method of Grouping Sound Sources in Areas Using Boundary of Area)

Figure 8B:
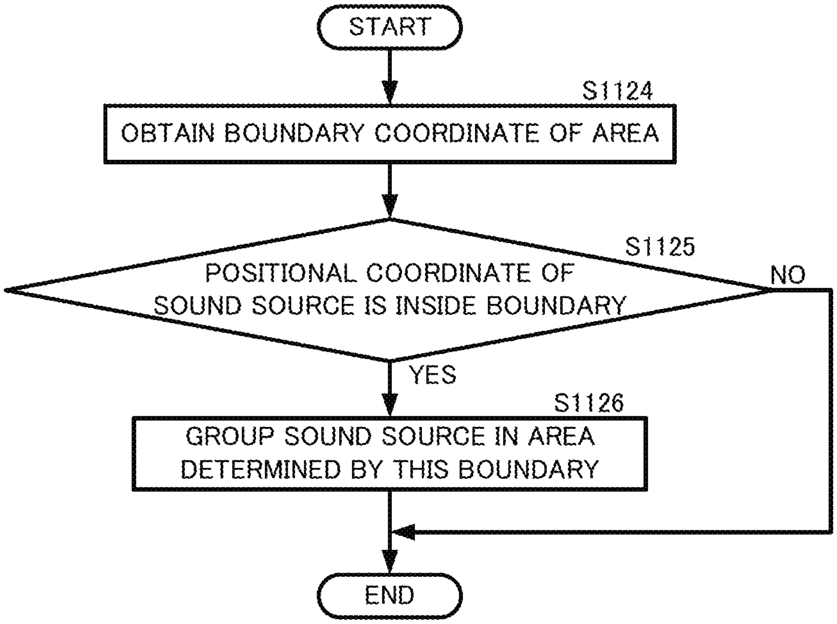
FIG. 8B is a flow chart showing a sound source grouping method using a boundary of an area.

FIG. 8B is a flow chart showing a sound source grouping method using a boundary of an area.

The area determiner 42 obtains coordinates information (a boundary coordinate) indicating a boundary line of each area Area1 to Area8 from the area information on the plurality of areas Area1 to Area8 (S1124). The area determiner 42 determines whether the position coordinate of the sound source to be determined for grouping is inside each area Area1 to Area8 (S1125). For example, the area determiner 42 performs inside-outside determination of the sound source to an area, by use of the Crossing Number Algorithm.

The area determiner 42, when a sound source is inside an area (S1125: YES), groups the sound source in this area (S1126).

For example, in a case of the sound source OBJ1 in the example of FIG. 7, the area determiner 42 detects the position coordinate of the sound source OBJ1, and obtains the coordinates information (the boundary coordinate) indicating a boundary line of the plurality of areas Area1 to Area8. The area determiner 42 performs the inside-outside determination of the sound source OBJ1 to the plurality of areas Area1 to Area8, from the position coordinate of the sound source OBJ1 and the boundary coordinate of the plurality of areas Area1 to Area8. The area determiner 42 detects that the sound source OBJ1 is inside the area Area1. The area determiner 42 groups the sound source OBJ1 in the area Area1.

The area determiner 42 groups the plurality of sound sources OBJ1 to OBJ96 in the plurality of areas Area1 to Area8. For example, in the case of the example of FIG. 7, the area determiner 42 groups the sound sources OBJ1 and OBJ4 in the area Area1, groups the sound source OBJ2 in the area Area2, and groups the sound source OBJ3 in the area Area5.

The area determiner 42 outputs grouping information to the matrix mixer 400. The grouping information is information indicating which sound source is grouped in which area, as described above.

The matrix mixer 400, based on the grouping information, generates area-specific audio signals SA1 to SA8 for each of the plurality of areas Area1 to Area8 by use of the audio signals S1 to S96 of the plurality of sound sources OBJ1 to OBJ96. For example, the matrix mixer 400, in a case in which a plurality of sound sources are grouped in an area, mixes audio signals of the plurality of sound sources, and generates an area-specific audio signal of this area. The matrix mixer 400 outputs the area-specific audio signal of each area to the initial reflected sound control signal generator 50. It is to be noted that the matrix mixer 400, when even one sound source is grouped in an area, outputs the audio signal of this sound source to the initial reflected sound control signal generator 50, as the area-specific audio signal of this area.

In the case of the example of FIG. 7, the sound sources OBJ1 and OBJ4 are grouped in the area Area1. The matrix mixer 400 mixes the audio signal S1 of the sound source OBJ1 and the audio signal S4 of the sound source OBJ4, and generates and outputs an area-specific audio signal SA1 of the area Area1. In addition, the sound source OBJ2 is grouped in the area Area2. The matrix mixer 400 outputs the audio signal S2 of the sound source OBJ2 as an area-specific audio signal SA2 of the area Area2. In addition, the sound source OBJ3 is grouped in the area Area5. The matrix mixer 400 outputs the audio signal S3 of the sound source OBJ3 as an area-specific audio signal SA5 of the area Area5.

With such a configuration and processing, the audio signal processing apparatus 10 groups a plurality of sound sources for each of a plurality of areas that divide a sound space, and thus is able to generate an initial reflected sound control signal. As a result, the audio signal processing apparatus 10 is able to reproduce an initial reflected sound according to a position of a sound source, and is able to obtain clear sound image localization and rich spatial expansion.

Figure 9:
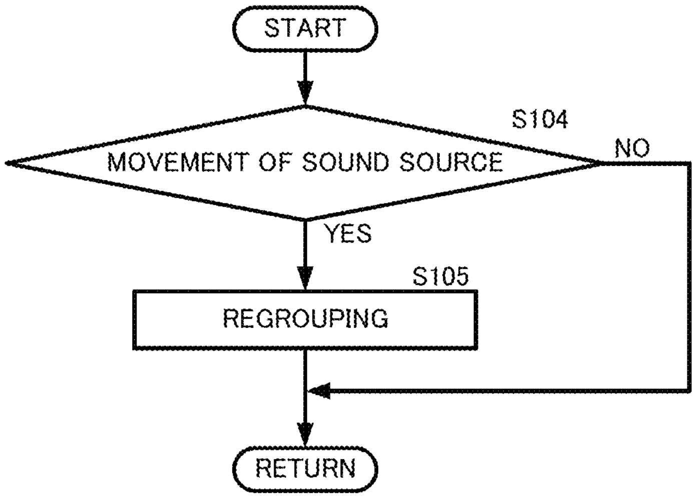
FIG. 9 is a flow chart showing an example of a grouping method by movement of a sound source.

It is to be noted that, although the above description does not show in detail a case in which a sound source moves, the grouping portion 40 performs processing shown in FIG. 9 in the case in which a sound source moves. FIG. 9 is a flow chart showing an example of a grouping method by movement of a sound source.

The sound source position detector 41 detects movement of a sound source (S104). The sound source position detector 41 may detect the movement of a sound source by an operation input from a user, for example. Alternatively, the sound source position detector 41 may detect the movement of a sound source by continuously detecting a sound source position by the position detection sensor. Then, the area determiner 42 regroups a moved sound source (S105). The sound source position detector 41 detects a position coordinate of the sound source after the movement, and outputs the position coordinate to the area determiner 42.

The area determiner 42 groups the plurality of sound sources in the plurality of areas Area1 to Area8, as described above, by use of the position coordinate of the sound source after the movement.

By performing such processing, the audio signal processing apparatus 10, even when a sound source moves, is able to generate an initial reflected sound control signal according to the position of the sound source after the movement. As a result, the audio signal processing apparatus 10 is able to reproduce a change in the initial reflected sound according to the movement of a sound source, and, even when a sound source moves, is able to obtain clear sound image localization and rich spatial expansion according to the movement.

In addition, when such movement of a sound source occurs, the audio signal processing apparatus 10 is able to perform crossfade processing on the initial reflected sound control signal before the movement and the initial reflected sound control signal after the movement. For example, when a sound source moves, the audio signal processing apparatus 10 gradually reduces a component of an audio signal of this sound source in the area-specific audio signal including the sound source before the movement. On the other hand, the audio signal processing apparatus 10 gradually increases the component of the audio signal of this sound source in the area-specific audio signal including the sound source after the movement.

By performing such processing, the audio signal processing apparatus 10 is able to significantly reduce a discontinuous change in the initial reflected sound when the sound source moves. As a result, the audio signal processing apparatus 10, when the sound source moves, is able to change the initial reflected sound more smoothly according to the movement of the sound source.

In addition, the matrix mixer 400 outputs the audio signals S1 to S96 of the plurality of sound sources OBJ1 to OBJ96, to the mixer 60. As described above, the mixer 60 sums the audio signals S1 to S96, and generates and outputs a reverberant sound generation signal Sr, to the reverberant sound control signal generator 70. The reverberant sound control signal generator 70 generates the reverberant sound control signals REV1 to REV64 by use of the reverberant sound generation signal Sr.

With such processing, the reverberant sound is not affected by the position or the movement of a sound source. Therefore, the audio signal processing apparatus 10 is able to more clearly reproduce the movement of a sound source by a change in the initial reflected sound, while keeping the reverberant sound in the reproduction space constant, even when the sound source moves.

(Generation of Initial Reflected Sound Control Signal)

Figure 10:
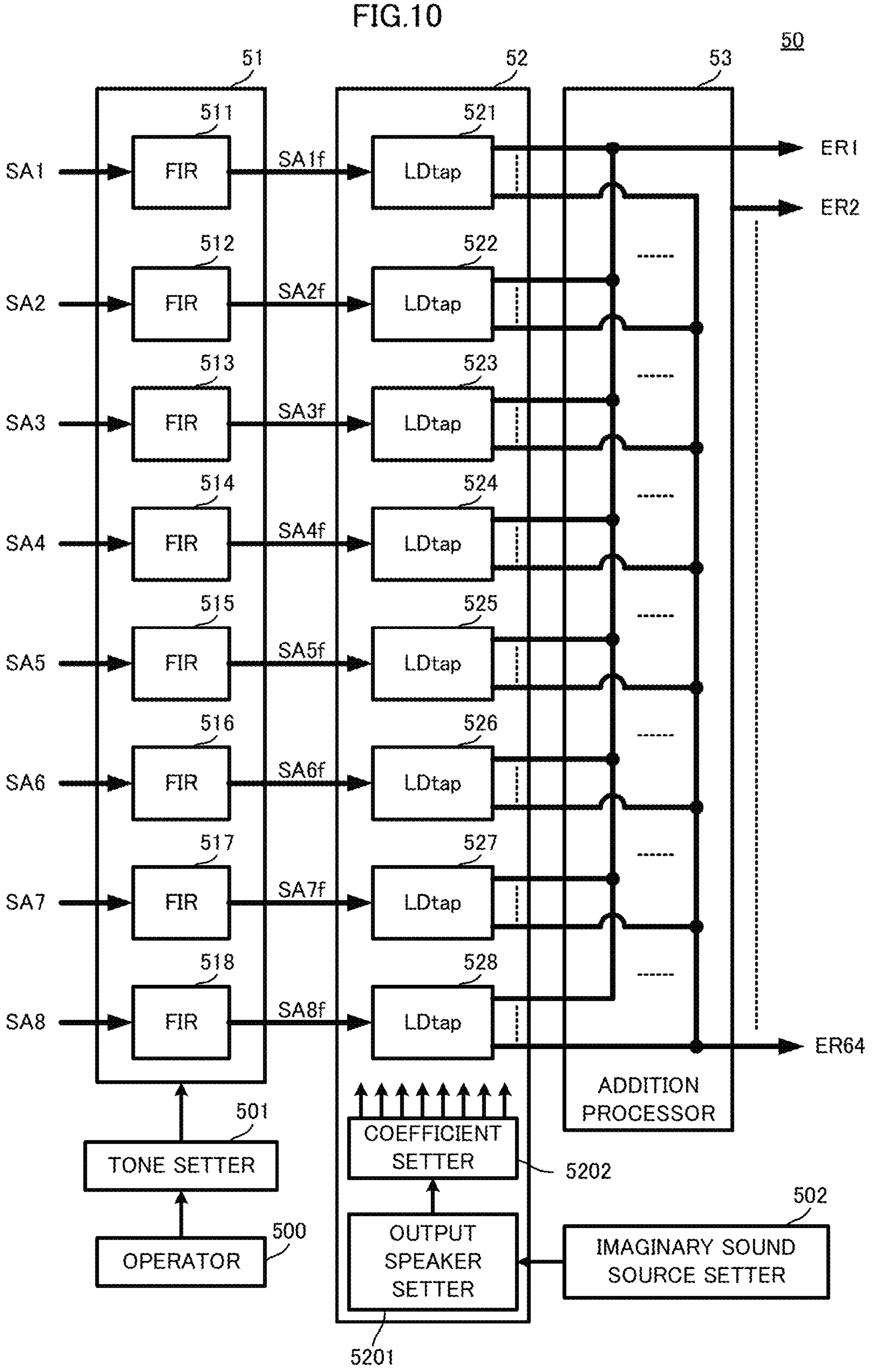
FIG. 10 is a functional block diagram showing an example of a configuration of an initial reflected sound control signal generator.
Figure 11:
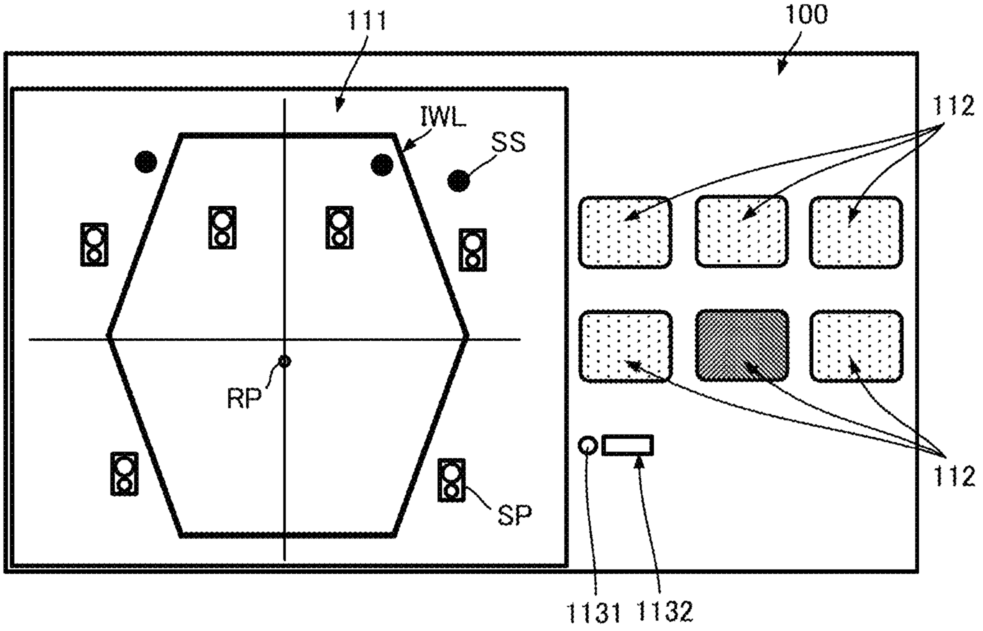
FIG. 11 is a view showing an example of a GUI.

FIG. 10 is a functional block diagram showing an example of a configuration of an initial reflected sound control signal generator 50. FIG. 11 is a view showing an example of a GUI.

As shown in FIG. 10, the initial reflected sound control signal generator 50 includes a FIR filter circuit 51, an LDtap circuit 52, an addition processor 53, a tone setter 501, an imaginary sound source setter 502, and an operator 500. The LDtap circuit 52 amplifys and delays an inputted signal and outputs an amplified and delayed signal. The FIR filter circuit 51 includes a plurality of FIR filters 511 to 518. The LDtap circuit 52 includes a plurality of LDtaps 521 to 528, an output speaker setter 5201, and a coefficient setter 5202. It is to be noted that the order of connection between the FIR filter circuit 51 and the LDtap circuit 52 may be reversed.

[Tone Adjustment of Initial Reflected Sound]

The operator 500 receives, from a user, designation information on a tone to be added to an initial reflected sound, and outputs the designation information to the tone setter 501. The designation information on a tone is information (information indicating filter characteristics) that designates low-frequency emphasis, high-frequency emphasis, volume of an initial reflected sound, attenuation characteristics of an initial reflected sound, or the like, for example.

As a specific example, the operator 500 receives an operation through a GUI (Graphical User Interface) 100 as shown in FIG. 11.

The GUI 100 includes a setting display window 111, a plurality of physical controllers 112, a knob 1131, and an adjustment value display window 1132.

The setting display window 111 displays a shape of the virtual wall IWL of the virtual space set by the plurality of physical controllers 112 and the knob 1131. In such a case, the setting display window 111 is able to display a position of a sound source SS, a position of a speaker SP, a position of a sound receiving point RP, and an axis of coordinates of the reproduction space that are separately set, together with the virtual wall IWL.

The plurality of physical controllers 112 are linked to samples (various types of halls, rooms, and the like) of a previously set virtual space. It is to be noted that, although illustration is omitted, the plurality of physical controllers 112 may have an index (a hall name, for example) that clearly indicates the sample of the virtual space linked to each of the physical controllers 112.

The knob 1131 sets a room size (the size of the reproduction space) of the virtual space. The adjustment value display window 1132 displays a setting value of the room size of the virtual space.

The GUI 100 receives various types of operations to adjust a tone. For example, the GUI 100 includes the plurality of physical controllers 112, a physical controller for low frequencies, a physical controller for high frequencies, a physical controller for volume control, and a physical controller for attenuation characteristic adjustment, and receives operation through these physical controllers.

When a user operates a desired physical controller by using the GUI 100, the operator 500 detects this operation and sets the designation information on a tone according to such an operation.

For example, the operator 500, when receiving a selection of the plurality of physical controllers 112, obtains the designation information on a tone previously set to the virtual space linked to the physical controllers 112. In addition, the operator 500, when receiving an operation through the physical controller for low frequencies, the physical controller for high frequencies, the physical controller for volume control, the physical controller for attenuation characteristic adjustment, and the like, obtains designation information on a tone set by these physical controllers.

It is to be noted that, although illustration is omitted, the GUI 100 is also able to display the designation information on a tone, by use of a filter coefficient of the FIR filters 511 to 518 to be described below, a schematic waveform, or the like, for example. In such a case, the GUI 100, when receiving adjustment to the designation information on a tone, is also able to change a display according to this adjustment. For example, the GUI 100 is also able to change a waveform display according to adjustment.

The tone setter 501 sets the filter coefficient of the FIR filters 511 to 518 of the FIR filter circuit 51, based on the designation information on a tone. For example, the tone setter 501, when receiving the designation information on low-frequency emphasis, sets a filter coefficient obtained by boosting the low frequencies of the FIR filters 511 to 518 of the FIR filter circuit 51. In addition, the tone setter 501, when receiving the designation information on high-frequency emphasis, sets a filter coefficient obtained by boosting the high frequencies of the FIR filters 511 to 518 of the FIR filter circuit 51. The tone setter 501 outputs the set filter coefficient to the FIR filter circuit 51. It is to be noted that the tone setter 501 is also able to set and adjust a sampling frequency and a filter length not only as a filter coefficient but as filter characteristics.

Moreover, the tone setter 501 sets a gain value of each tap of the FIR filters 511 to 518 of the FIR filter circuit 51, based on the designation information on a tone. The tone setter 501 outputs the set gain value to the FIR filter circuit 51.

The plurality of FIR filters 511 to 518 are filters respectively corresponding to the area-specific audio signals SA1 to SA8. The area-specific audio signals SA1 to SA8 are inputted to the FIR filters 511 to 518. For example, as shown in FIG. 10, the area-specific audio signal SA1 is inputted to the FIR filter 511, the area-specific audio signal SA2 is inputted to the FIR filter 512, the area-specific audio signal SA3 is inputted to the FIR filter 513, and the area-specific audio signal SA4 is inputted to the FIR filter 514. The area-specific audio signal SA5 is inputted to the FIR filter 515, the area-specific audio signal SA6 is inputted to the FIR filter 516, the area-specific audio signal SA7 is inputted to the FIR filter 517, and the area-specific audio signal SA8 is inputted to the FIR filter 518.

The plurality of FIR filters 511 to 518 each include the same number of taps. For example, the plurality of FIR filters 511 to 518 each include 16000 taps. It is to be noted that this number of taps is just an example and may be set based on resource conditions of the audio signal processing apparatus 10, the accuracy of a tone of an initial reflected sound desired to be reproduced, and other factors.

The plurality of FIR filters 511 to 518 perform filter processing (a convolution operation) on each of the plurality of area-specific audio signals SA1 to SA8, with the filter coefficient and gain value that have been set by the tone setter 501. As a result, the plurality of FIR filters 511 to 518 generate area-specific audio signals SA1*f* to SA8*f* on which the filter processing has been performed. For example, the FIR filter 511 performs the filter processing (the convolution operation) on the area-specific audio signal SA1, and generates the area-specific audio signal SA1*f* on which the filter processing has been performed, with the filter coefficient and gain value that have been set by the tone setter 501. Similarly, the plurality of FIR filters 512 to 518 individually generate the area-specific audio signals SA2*f* to SA8*f* on which the filter processing has been performed, from the area-specific audio signals SA2 to SA8.

The plurality of FIR filters 511 to 518 output the area-specific audio signals SA1*f* to SA8*f* on which the filter processing has been performed, to the plurality of LDtaps 521 to 528. For example, the FIR filter 511 outputs the area-specific audio signal SA1*f* on which the filter processing has been performed, to the LDtap 521. Similarly, the plurality of FIR filters 512 to 518 output the area-specific audio signals SA2*f* to SA8*f* on which the filter processing has been performed, to the plurality of LDtaps 522 to 528.

It is to be noted that the designation information on a tone is not limited to information that emphasizes a frequency range, and also includes information that makes the waveform of the initial reflected sound have characteristics desired by a user. By using such designation information on a tone, the audio signal processing apparatus 10 is able to obtain the initial reflected sound with a tone that is more diverse and matches preference of the user.

[Imaginary Sound Source Setting and Setting of LDtap]

The imaginary sound source setter 502 sets an imaginary sound source, based on the position coordinate of the sound receiving point in the reproduction space, and the geometrical shape of the virtual space.

Figure 12:
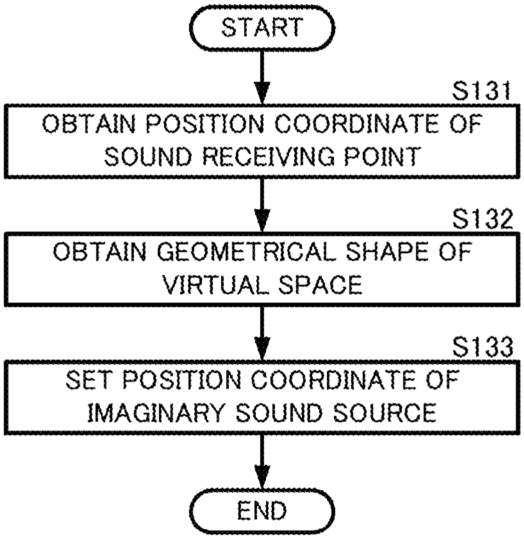
FIG. 12 is a flow chart showing an example of processing of setting an imaginary sound source.

FIG. 12 is a flow chart showing an example of processing of setting an imaginary sound source. The imaginary sound source setter 502 obtains the position coordinate of the sound receiving point in the reproduction space (S131). For example, the imaginary sound source setter 502 obtains the position coordinate of the sound receiving point in the reproduction space by an operation input from a user, detection of a position by the position detection sensor, or the like.

The imaginary sound source setter 502 obtains the geometrical shape of the virtual space (S132). For example, the imaginary sound source setter 502 obtains the geometrical shape of the virtual space by an operation input from a user, or the like. The geometrical shape of the virtual space includes coordinates group indicating the shape of a wall disposed in the virtual space.

The imaginary sound source setter 502 is connected to the GUI 100. When a user selects a desired physical controller 112 from the plurality of physical controllers 112, the GUI 100 reads and obtains the geometrical shape of the virtual space linked to this physical controller 112. In addition, when the user adjusts a room size by using the knob 1131, the GUI 100 obtains an adjustment value of this room size.

The imaginary sound source setter 502 obtains a position coordinate of the geometrical shape of the virtual space of which the room size is set, based on each setting that the GUI 100 has obtained as described above. In addition, the imaginary sound source setter 502 obtains a position coordinate of the sound source SS, and a position coordinate of the sound receiving point (the center of a room (the center of the reproduction space)) RP. The imaginary sound source setter 502 sets an imaginary sound source, as shown below, by use of these pieces of obtained information.

The imaginary sound source setter 502 matches a coordinate system of the reproduction space with a coordinate system of the virtual space. The imaginary sound source setter 502 sets the position coordinate of the imaginary sound source in the reproduction space, based on a concept using FIG. 4A and FIG. 4B by use of the position coordinate of the sound receiving point of the reproduction space, and the geometrical shape of the virtual space (S133).

Figure 13A:
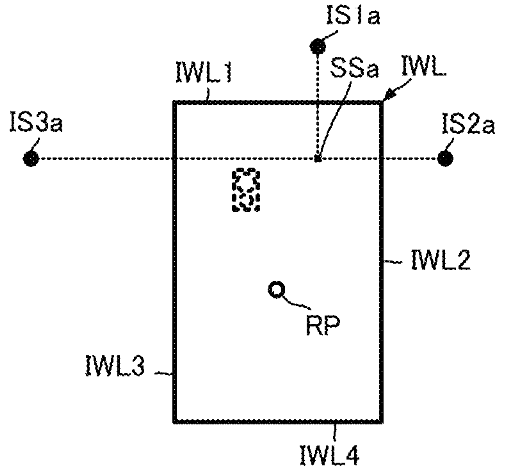
FIG. 13A and FIG. 13B are views each showing an example of setting an imaginary sound source in a case in which geometrical shapes are different.
Figure 13B:
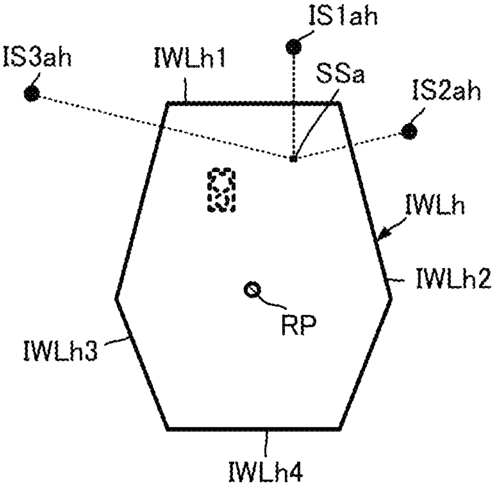

FIG. 13A and FIG. 13B are views each showing an example of setting an imaginary sound source in a case in which geometrical shapes are different. FIG. 13A shows a square virtual wall IWL, in a plan view, and FIG. 13B shows a hexagonal virtual wall IWLh, in a plan view.

As described above, when the geometrical shapes of the virtual space are different, even when the position coordinate of a sound source SSa and the position coordinate of a sound receiving point RP do not change, a positional relationship between the sound source SSa and the sound receiving point RP, and the virtual wall IWL is different from the positional relationship of the sound source SSa and the sound receiving point RP, and the virtual wall IWLh. As a result, the positions of imaginary sound sources IS1*a*, IS2*a*, and IS3*a* that are set in a case of FIG. 13A are different from the positions of imaginary sound sources IS1*ah*, IS2*ah*, and IS3*ah* that are set in FIG. 13B.

Figure 14A:
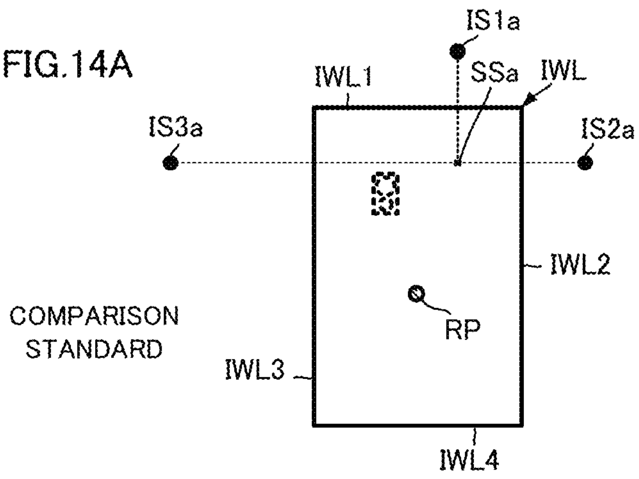
FIG. 14A, FIG. 14B, and FIG. 14C are views showing an example of setting an imaginary sound source.
Figure 14B:
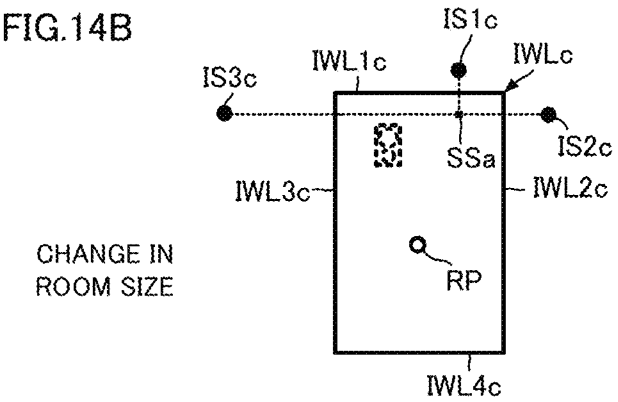
Figure 14C:
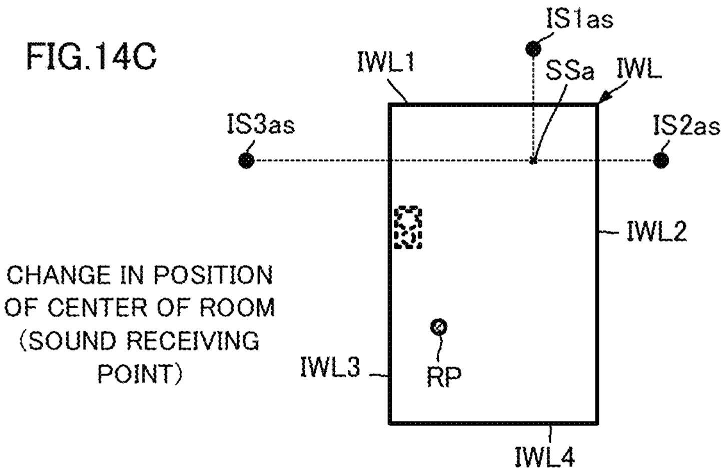

FIG. 14A, FIG. 14B, and FIG. 14C are views showing an example of setting an imaginary sound source. FIG. 14A, FIG. 14B, and FIG. 14C are views showing a planar change in the imaginary sound source. FIG. 14B, compared with FIG. 14A, shows a case in which the positions of the sound source SSa to the reference point (the sound receiving point RP) are the same and the sizes of the virtual space are different. FIG. 14C, compared with FIG. 14A, shows a case in which the sizes of the virtual space are the same and the positional relationship between the reference point of the virtual space and the reference point (the sound receiving point) of the reproduction space changes (a case in which the center of a room of the reproduction space changes).

As can be seen from a result of comparison between FIG. 14A and FIG. 14B, the sizes (described as a virtual wall IWL in FIG. 14A and a virtual wall IWLc in FIG. 14B) of the virtual space in the reproduction space are different, so that the distance and positional relationship between the sound source SSa being the origin of the imaginary sound source and the virtual wall are different. As a result, the positions of imaginary sound sources IS1*a*, IS2*a*, and IS3*a* that are set in a case of FIG. 14A are different from the positions of imaginary sound sources IS1*c*, IS2*c*, and IS3*c* that are set in FIG. 14B.

In addition, as can be seen from a result of comparison between FIG. 14A and FIG. 14C, the positional relationship between the reference point of the virtual space and the reference point RP changes, so that the position (the position of the imaginary sound source with respect to the sound receiving point RP and a speaker) of the imaginary sound source in the reproduction space is moved. As a result, the positions of the imaginary sound sources IS1*a*, IS2*a*, and IS3*a* that are set in a case of FIG. 14A are different from the positions of imaginary sound sources IS1*as*, IS2*as*, and IS3*as* that are set in a case of FIG. 14C.

Figure 15A:
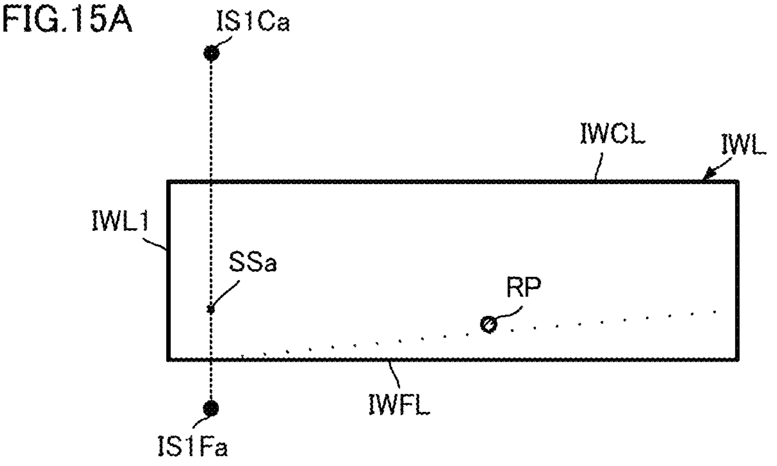
FIG. 15A, FIG. 15B, and FIG. 15C are views showing an example of setting an imaginary sound source.
Figure 15B:
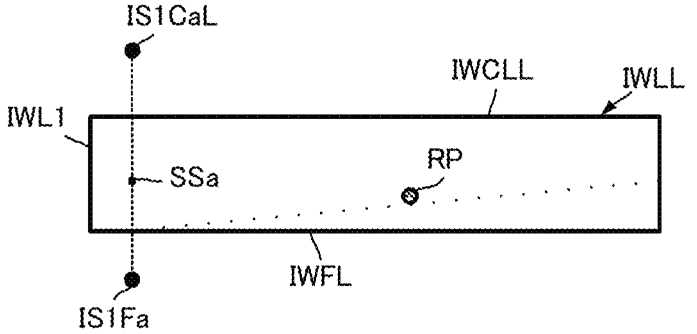
Figure 15C:
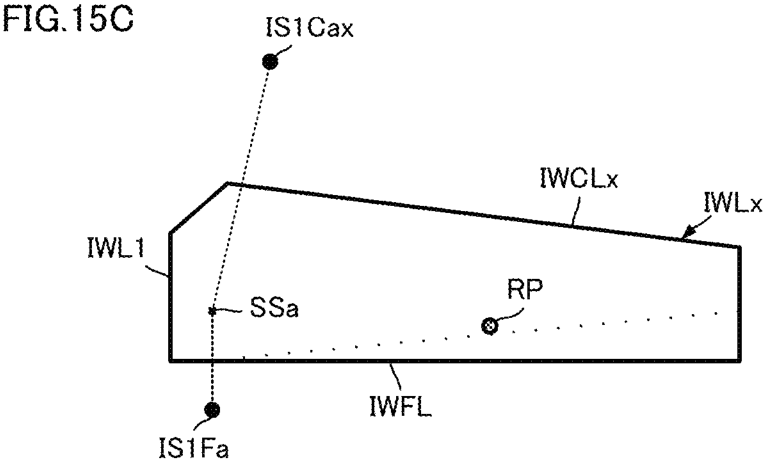

FIG. 15A, FIG. 15B, and FIG. 15C are views showing an example of setting an imaginary sound source. FIG. 15A, FIG. 15B, and FIG. 15C are views showing a change in the position of the imaginary sound source in a height direction.

FIG. 15A and FIG. 15B show different heights of a ceiling. In other words, the distance (the height) from a virtual wall IWFL of a floor in the virtual wall IWL shown in FIG. 15A to a virtual wall IWCL of the ceiling is different from the distance (the height) from the virtual wall IWFL of the floor in a virtual wall IWLL shown in FIG. 15B to a virtual wall IWCLL of the ceiling.

As can be seen from a result of comparison between FIG. 15A and FIG. 15B, the heights of the ceiling are different, so that the distance and positional relationship between the sound source SSa being the origin of the imaginary sound source and the virtual walls IWCL and IWCLL of the ceiling are different. As a result, the position of an imaginary sound source IS1Ca set in a case of FIG. 15A is different from the position of an imaginary sound source IS1CaL set in a case of FIG. 15B.

FIG. 15A and FIG. 15C show different shapes of a ceiling. In other words, the shape of the virtual wall IWCL of the ceiling in the virtual wall IWL shown in FIG. 15A is different from the shape of a virtual wall IWCLx of the ceiling in a virtual wall IWLx shown in FIG. 15C.

As can be seen from a result of comparison between FIG. 15A and FIG. 15C, the shapes of the ceiling are different, so that the positional relationships between the sound source SSa being the origin of the imaginary sound source and the virtual walls IWCL and IWCLx of the ceiling are different. As a result, the position of the imaginary sound source IS1Ca set in the case of FIG. 15A is different from the position of an imaginary sound source IS1Cax set in a case of FIG. 15C.

As described above, the imaginary sound source setter 502 is able to optimally set the position of the imaginary sound source in the reproduction space, corresponding to the geometrical shape of the virtual space, and the positional relationship (such as a positional relationship between the reference points of the spaces, for example) between the reproduction space and the virtual space. As a result, the audio signal processing apparatus 10 is able to clarify the sound image localization of the initial reflected sound, corresponding to the position coordinate of a speaker in the reproduction space, the geometrical shape of the virtual space, and the positional relationship between the reproduction space and the virtual space.

The imaginary sound source setter 502 outputs the position coordinate of the imaginary sound source set for each of the plurality of areas Area1 to Area8, to the output speaker setter 5201 of the LDtap circuit 52.

Figure 16:
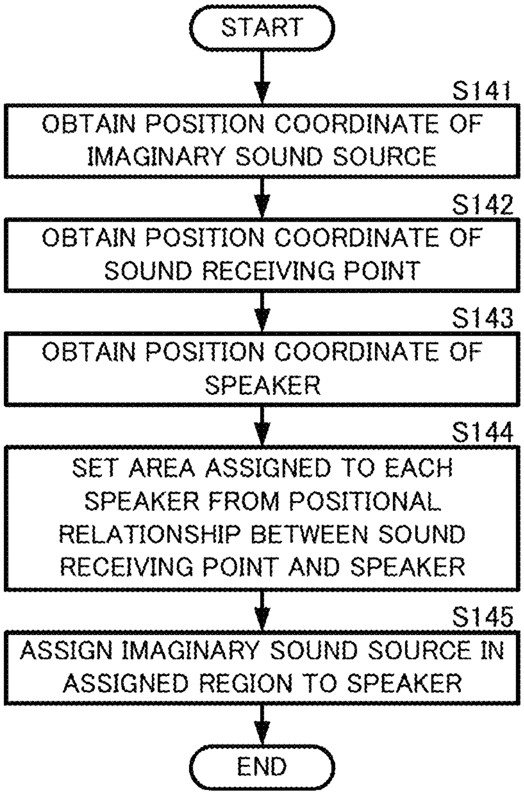
FIG. 16 is a flow chart showing processing of assigning an imaginary sound source to a speaker.

The output speaker setter 5201 sets an imaginary sound source IS that assigns for each speaker based on the position coordinate of the imaginary sound source IS, the position coordinate of the sound receiving point RP, and the position coordinates of the plurality of speakers SP1 to SP64. FIG. 16 is a flow chart showing processing of assigning an imaginary sound source to a speaker.

The output speaker setter 5201 obtains the position coordinate of an imaginary sound source from the imaginary sound source setter 502 (S141). The output speaker setter 5201 obtains the position coordinate of a sound receiving point in the reproduction space, for example, by an operation input from a user, or the like (S142). The output speaker setter 5201 obtains the position coordinate of a plurality of speakers SP1 to SP64, for example, by an operation input from a user, or the like (S143).

The output speaker setter 5201 sets an assigned region assigned to an imaginary sound source for each speaker, from the positional relationship between the sound receiving point RP in the reproduction space and the plurality of speakers SP1 to SP64 (S144).

Figure 17A:
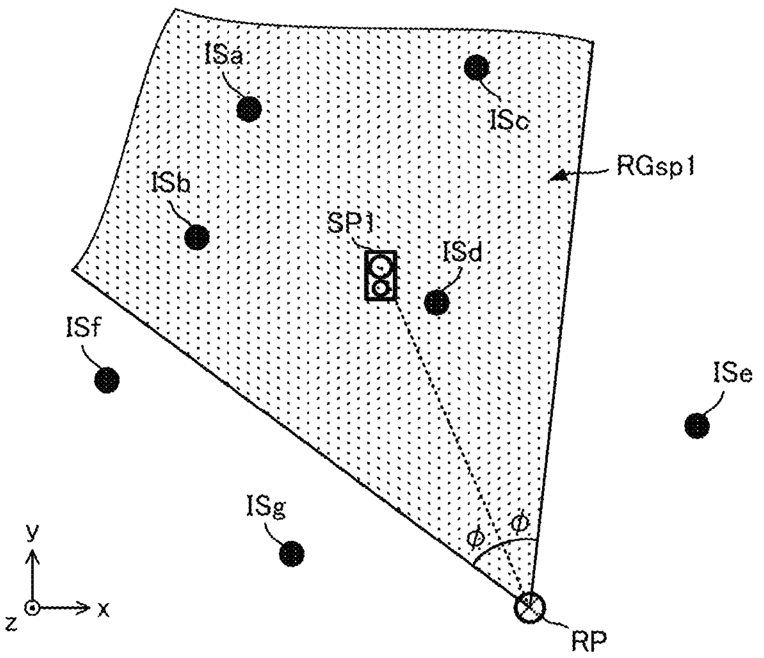
FIG. 17A and FIG. 17B are views showing a concept of assigning an imaginary sound source to a speaker.
Figure 17B:
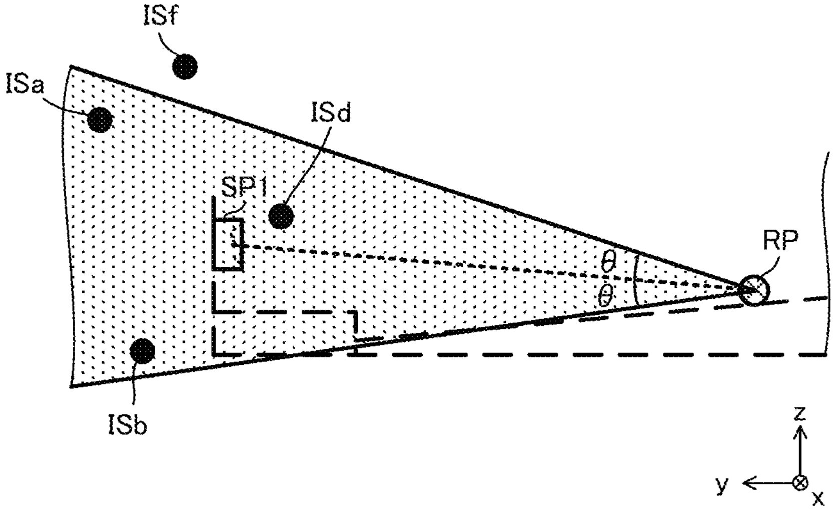

More specifically, the output speaker setter 5201 sets an assigned region assigned to the imaginary sound source for each speaker as follows. FIG. 17A and FIG. 17B are views showing a concept of assigning an imaginary sound source to a speaker. FIG. 17A shows a concept of assignment using an azimuth φ, and FIG. 17B shows a concept of assignment using an elevation-depression angle θ. In addition, although the speaker SP1 will be described hereinafter as an example, the output speaker setter 5201 also sets an assigned region assigned to the other speakers SP2 to SP64 in the same manner.

The output speaker setter 5201 sets a straight line (a dashed line in FIG. 17A) passing the sound receiving point RP and the speaker SP1 by use of the position coordinate of the sound receiving point RP and the position coordinate of the speaker SP1. As shown in FIG. 17A, the output speaker setter 5201 sets an azimuth φ that expands near the speaker SP1 with reference to the sound receiving point RP on a plane, with respect to this straight line (the dashed line in FIG. 17A). The azimuth φ is an angle in a horizontal direction to the straight line passing the sound receiving point RP and the speaker SP1. In addition, as shown in FIG. 17B, the output speaker setter 5201 sets an elevation-depression angle θ expanding in a vertical direction perpendicular to a plane, with respect to the straight line (the dashed line in FIG. 17B) described above. The elevation-depression angle θ is an angle in the vertical direction (a direction perpendicular to the horizontal direction) to the straight line passing the sound receiving point RP and the speaker SP1.

The output speaker setter 5201 sets a space closer to the speaker SP1 than to a boundary (a boundary plane to determine a horizontal area, a boundary plane to determine a vertical area) determined by this azimuth φ and the elevation-depression angle θ as an assigned region RGSP1 of the speaker SP1.

The output speaker setter 5201 obtains the position coordinate of a plurality of imaginary sound sources IS (a plurality of imaginary sound sources ISa to ISg in a case of FIG. 17).

The output speaker setter 5201 determines whether the plurality of imaginary sound sources ISa to ISg are in the assigned region RGSP1 by use of the position coordinate of the plurality of imaginary sound sources ISa to ISg and the coordinates indicating the assigned region RGSP1. This determination is able to be made by the same method as the method of the grouping to the area of the sound source described above.

The output speaker setter 5201, by performing this determination processing, in a case shown in FIG. 14A, FIG. 14B, and FIG. 14C, for example, determines that the plurality of imaginary sound sources ISa, ISb, ISc, and ISd are inside the assigned region RGSP1 and determines that the plurality of imaginary sound sources ISe, ISf, and ISg are outside the assigned region RGSP1.

The output speaker setter 5201 assigns the plurality of imaginary sound sources ISa, ISb, ISc, and ISd that are determined to be in the assigned region RGSP1, to the speaker SP1 (S145).

The output speaker setter 5201 outputs assignment information on the plurality of imaginary sound sources to the plurality of speakers SP1 to SP64, to the coefficient setter 5202. In such a case, the output speaker setter 5201 outputs the position coordinate of the sound receiving point RP, the position coordinates of the plurality of speakers SP1 to SP64, and the position coordinate of the plurality of imaginary sound sources, with the assignment information, to the coefficient setter 5202.

It is to be noted that the azimuth φ is 60 degrees, for example, and the elevation-depression angle θ is 45 degrees, for example. The angular degree of these azimuth φ and elevation-depression angle θ is an example, and is able to be set and adjusted, for example, by an operation input from a user.

The coefficient setter 5202 sets a tap coefficient to be given to the LDtaps 521 to 528 by use of the distance between the sound receiving point RP and the plurality of speakers SP1 to SP64, and the distance between the sound receiving point RP and the imaginary sound source IS. The tap coefficient to be given to the LDtaps 521 to 528 is a gain value and delay amount of the LDtaps 521 to 528.

Figure 18:
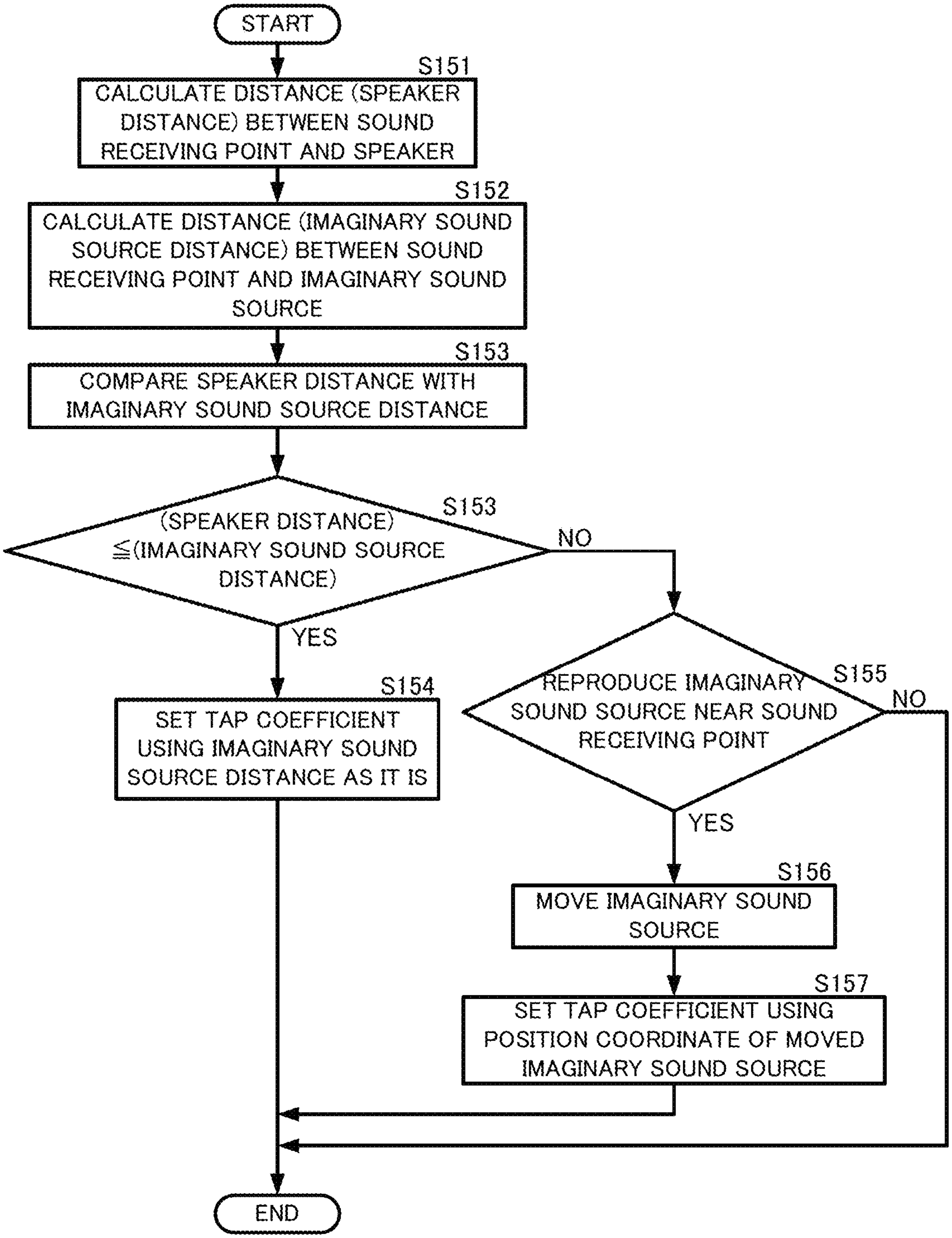
FIG. 18 is a flow chart showing LDtap coefficient setting processing.
Figure 19A:
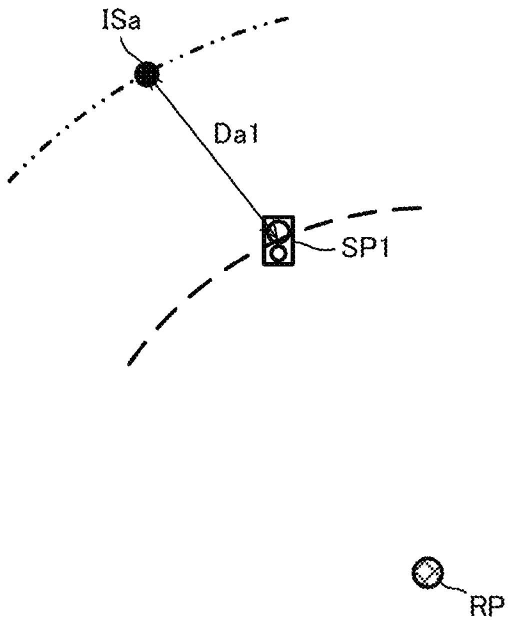
FIG. 19A and FIG. 19B are views for illustrating a concept of coefficient setting.
Figure 19B:
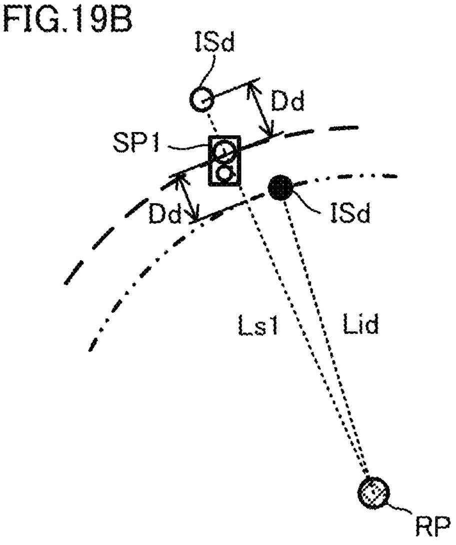

FIG. 18 is a flow chart showing LDtap coefficient setting processing. FIG. 19A and FIG. 19B are views for illustrating a concept of coefficient setting.

The coefficient setter 5202 calculates a distance (a speaker distance) between the sound receiving point PR and the plurality of speakers SP1 to SP64 by use of the position coordinate of the sound receiving point RP, and the position coordinates of the plurality of speakers SP1 to SP64 (S151).

The coefficient setter 5202 calculates a distance (an imaginary sound source distance) between the sound receiving point PR and the plurality of imaginary sound source IS (S152).

The coefficient setter 5202 compares the speaker distance with the imaginary sound source distance for the plurality of speakers SP1 to SP64 and the plurality of imaginary sound sources IS respectively assigned to the plurality of speakers SP1 to SP64 (S153). For example, in a case of the example of FIG. 17A, the speaker distance is compared with the imaginary sound source distance for the speaker SP1, and the plurality of imaginary sound sources ISa, ISb, ISc and ISd.

The coefficient setter 5202, when the speaker distance is less than or equal to the imaginary sound source distance (YES in S153), uses the imaginary sound source distance as it is, and sets a tap coefficient (S154).

For example, in a case as shown in FIG. 19A, the imaginary sound source ISa is farther from the sound receiving point RP than from the speaker SP1. An imaginary sound source distance Lia between the sound receiving point RP and the imaginary sound source ISa is larger than a speaker distance Ls1 between the sound receiving point RP and the speaker SP1.

In such a case, the coefficient setter 5202 uses a distance Dal between the imaginary sound source ISa and the speaker SP1, and sets a tap coefficient. Specifically, the coefficient setter 5202 sets a gain value and a delay amount that are set to the imaginary sound source ISa by the distance Dal. The coefficient setter 5202 sets a smaller gain value for a larger distance Dal, and a larger delay amount for the larger distance Dal.

The coefficient setter 5202, when the speaker distance is larger than the imaginary sound source distance (NO in S153), determines whether this imaginary sound source is reproduced. In other words, the coefficient setter 5202 determines whether the imaginary sound source closer to the sound receiving point than the speaker is reproduced (S155).

The coefficient setter 5202, when the imaginary sound source closer to the sound receiving point than the speaker is reproduced (YES in S155), moves the position of this imaginary sound source (S156). More specifically, the coefficient setter 5202 moves the position of the imaginary sound source that is closer to the sound receiving point than to a speaker, to a position farther from the sound receiving point than from a speaker. In such a case, the coefficient setter 5202 moves the position of the imaginary sound source by use of a distance difference between the imaginary sound source and the speaker. The coefficient setter 5202 sets a tap coefficient by use of the position coordinate of the imaginary sound source after movement (S157).

For example, in a case as shown in FIG. 19B, the imaginary sound source ISd is closer to the sound receiving point RP than to the speaker SP1. An imaginary sound source distance Lid between the sound receiving point RP and the imaginary sound source ISd is smaller than the speaker distance Ls1 between the sound receiving point RP and the speaker SP1.

In such a case, the coefficient setter 5202 moves the imaginary sound source ISd by use of a distance difference Dd of the imaginary sound source distance Lid and the speaker distance Ls1. More specifically, the coefficient setter 5202 moves the imaginary sound source ISd to a position away by the distance difference Dd, the position being on a straight line passing the sound receiving point RP and the speaker SP1 and on a side opposite to the sound receiving point RP with reference to the speaker SP1. Then, the coefficient setter 5202 sets a tap coefficient by use of this distance difference Dd. Specifically, the coefficient setter 5202 sets a gain value and a delay amount that are set to the imaginary sound source ISd by the distance difference Dd. The coefficient setter 5202 sets a smaller gain value for a larger distance difference Dd, and a larger delay amount for the larger distance difference Dd.

It is to be noted that, conceptually, the imaginary sound source is moved, as described above. However, as processing of setting a tap coefficient, the coefficient setter 5202 may set a tap coefficient according to the distance of a speaker distance and an imaginary sound source distance.

In other words, the coefficient setter 5202 moves only the imaginary sound source located between the sound receiving point and the speaker. At this time, it is preferable that the coefficient setter 5202 does not move the imaginary sound source located more outside than the speaker with respect to the sound receiving point, this outside imaginary sound source may move within a predetermined range. For example, even when this outside imaginary sound source moves, a distance between the outside imaginary sound source and a speaker may be within a predetermined range. The predetermined range is within a range to an extent in which a change in the initial reflected sound control signal due to movement does not give an audience an uncomfortable feeling.

The coefficient setter 5202, when the imaginary sound source closer to the sound receiving point than the speaker is not reproduced (NO in S155), does not set a tap coefficient with respect to this imaginary sound source.

The coefficient setter 5202 sets the tap coefficient set to each speaker SP1 to SP64, to the plurality of LDtaps. More specifically, the coefficient setter 5202, based on an imaginary sound source position set to the area Area1, sets the tap coefficient set to each speaker SP1 to SP64, to the LDtap 521. Similarly, the coefficient setter 5202, based on an imaginary sound source position set to each of the plurality of areas Area2 to Area8, sets the tap coefficient of the imaginary sound source assigned to each speaker SP1 to SP64, to each of the LDtaps 522 to 528.

The plurality of LDtaps 521 to 528 perform gain processing and delay processing on the area-specific audio signals SA1$f$ to SA8$f$ on which the filter processing has been performed, according to the set tap coefficient, and output the signals to the addition processor 53. More specifically, the tap coefficient, as described above, is set according to a combination of the imaginary sound source position in the plurality of areas, and each speaker. Therefore, the plurality of LDtaps 521 to 528 set the tap coefficient based on the imaginary sound source assigned to this speaker for each speaker. The plurality of LDtaps 521 to 528 perform the gain processing and the delay processing on the area-specific audio signals SA1*f* to SA8*f* on which the filter processing has been performed, for each speaker. The plurality of LDtaps 521 to 528 output the signals on which the gain processing and the delay processing have been performed, to each speaker.

For example, in a case in which the imaginary sound sources ISa, ISb, ISc, and ISd are assigned to the speaker SP1, the LDtap 521 performs the gain processing and the delay processing on the area-specific audio signal SA1*f* on which the filter processing has been performed, by the tap coefficient (the gain value and the delay amount) based on the imaginary sound sources ISa, ISb, ISc, and ISd. Then, the LDtap 521 outputs this signal to the addition processor 53 for the speaker SP1. The plurality of LDtaps 522 to 528, as with the LDtap 521, perform such processing on the imaginary sound source to which the tap coefficient has been set.

The addition processor 53 adds the signals for each of the plurality of speakers SP1 to SP64, the signal having been performed by the LDtap processing for each of the plurality of speakers SP1 to SP64 and having been outputted from the plurality of LDtaps 521 to 528. The addition processor 53 outputs these added signals to the adder 80 as the initial reflected sound control signals ER1 to ER64 for each of the plurality of speakers SP1 to SP64.

By performing such processing, the initial reflected sound control signal generator 50 is able to generate an initial reflected sound control signal which has the following feature.

Figure 20A:
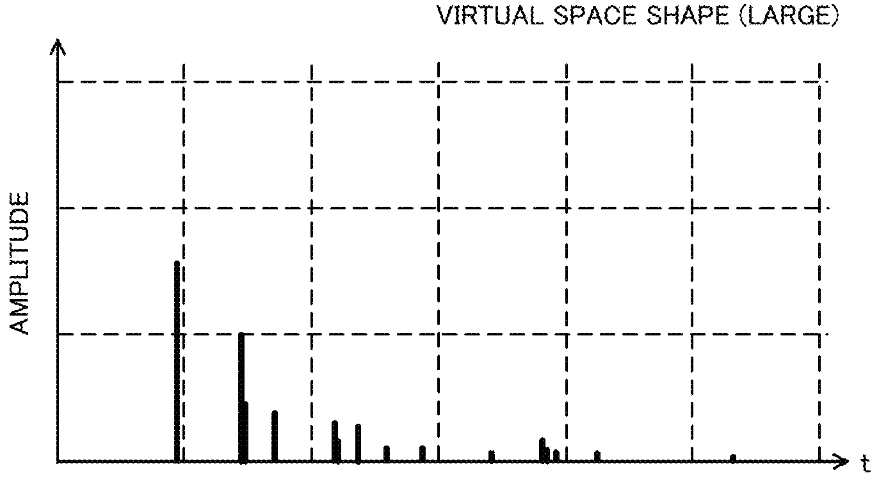
FIG. 20A shows an example of an LDtap coefficient in a case in which a shape of a virtual space is large.
Figure 20B:
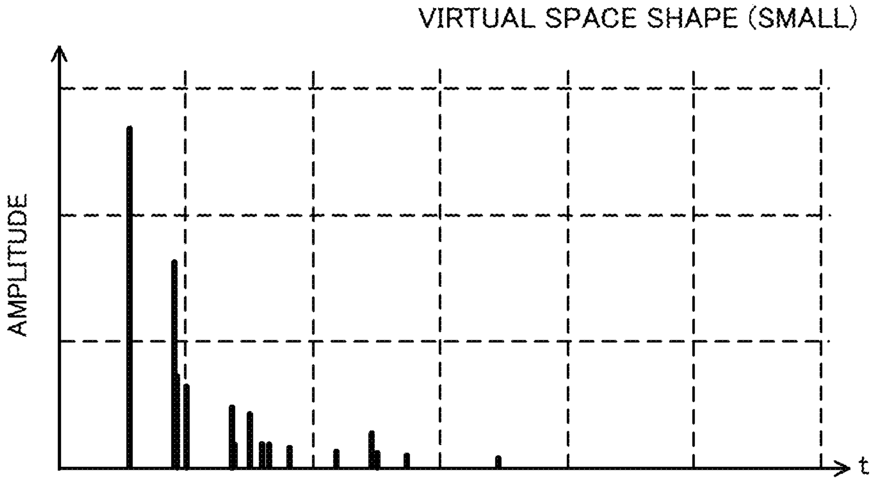
FIG. 20B shows an example of an LDtap coefficient in a case in which the shape of the virtual space is small.

FIG. 20A and FIG. 20B are waveform diagrams showing an example of a relationship between a shape of the virtual space and a component of the initial reflected sound control signal that are obtained by the LDtap. FIG. 20A shows a case in which the shape of the virtual space is large, and FIG. 20B shows a case in which the shape of the virtual space is small. It is to be noted that FIG. 20A and FIG. 20B show an example of the component of an initial reflected sound control signal when a plurality of imaginary sound sources are set to one speaker.

In a case in which the positional relationship between the reproduction space and the virtual space does not change and the position of a sound receiving point and the position of a speaker do not change, distribution of imaginary sound sources is spread over a wider area when the shape of the virtual space is large than when the shape of the virtual space is small. Therefore, as shown in FIG. 20A and FIG. 20B, when the shape of the virtual space is large, each component set by the LDtaps 521 to 528 is easily reduced, and a distribution range on a time axis is increased.

As described above, by performing the above processing, the initial reflected sound control signal generator 50 is able to set an optimal tap coefficient according to the shape of the virtual space.

Furthermore, even when the positional relationship between the virtual space and the reproduction space changes, the position of a speaker changes, or the sound receiving point changes, as with the case in which the shape of the virtual space changes, the initial reflected sound control signal generator 50 is able to set an optimal tap coefficient according to these changes.

In such a case, the plurality of sound sources OBJ1 to OBJ96 are optimally assigned to the plurality of speakers SP1 to SP64 through the grouping by the plurality of areas Area1 to Area8. Then, the plurality of imaginary sound sources are optimally set to the plurality of speakers SP1 to SP64. Therefore, the audio signal processing apparatus 10, even with a change in the relationship between the virtual space and the reproduction space, a change in the position of the sound receiving point RP, a change in the position of the plurality of speakers SP1 to SP64, or a change in the position of the sound sources OBJ1 to OBJ96, is able to clarify the sound image localization by the initial reflected sound according to these changes.

In addition, with the above configuration, the initial reflected sound control signal generator 50, even when the imaginary sound source IS is located closer to the sound receiving point RP than to the speaker SP, is able to reproduce the component of the initial reflected sound control signal by this imaginary sound source IS in a simulated manner. Therefore, for example, when the number of imaginary sound sources set to the initial reflected sound control signal is small, or the like, the initial reflected sound control signal generator 50 is able to use the imaginary sound source located closer to the sound receiving point RP than to the speaker SP. In such a case, the initial reflected sound control signal generator 50 repositions the imaginary sound source outside the speaker by use of the distance difference between the imaginary sound source IS and the speaker SP as described above. In addition, the imaginary sound source IS is not set at the position of the speaker SP, so that the plurality of imaginary sound sources IS located closer to the sound receiving point RP than to the speaker SP are able to be significantly reduced from being concentrating on the position of the speaker. As a result, the initial reflected sound control signal generator 50 is able to significantly reduce discomfort in the initial reflected sound due to movement of the position of the imaginary sound source.

It is to be noted that, in the above configuration, the initial reflected sound control signal generator 50, in a case in which the imaginary sound source IS is located closer to the sound receiving point RP than to the speaker SP, may set this imaginary sound source IS at the position of the speaker SP. As a result, the initial reflected sound control signal generator 50 is able to reduce a load of processing of moving the imaginary sound source IS.

Furthermore, in the above configuration, the initial reflected sound control signal generator 50, in a case in which the imaginary sound source IS is located closer to the sound receiving point RP than to the speaker SP, may not use this imaginary sound source IS to generate an initial reflected sound control signal. As a result, the initial reflected sound control signal generator 50 does not need the load of the processing of moving the imaginary sound source IS, and is able to reduce the load of processing of generating an initial reflected sound control signal.

In addition, in the above configuration, the initial reflected sound control signal generator 50 performs tone adjustment using the FIR filters 511 to 518 along with setting of the component of the initial reflected sound control signal by an imaginary sound source. The FIR filters 511 to 518 have the above number of taps (16000 taps, for example), and have the larger number of taps than the LDtaps 521 to 528. In addition, a time interval (dependent on a sampling frequency) of the taps of the FIR filters 511 to 518 is shorter than a time interval (dependent on arrangement of the imaginary sound sources) between the taps of the LDtaps 521 to 528. Therefore, components of the initial reflected sound control signal generated by the FIR filters 511 to 518 are arranged on the time axis more precisely than components of the initial reflected sound control signal generated by the LDtaps 521 to 528. In other words, a resolution (a temporal resolution) on the time axis of the FIR filters 511 to 518 is higher than a resolution of the LDtaps 521 to 528, and has the large number of components per unit time.

Figure 21:
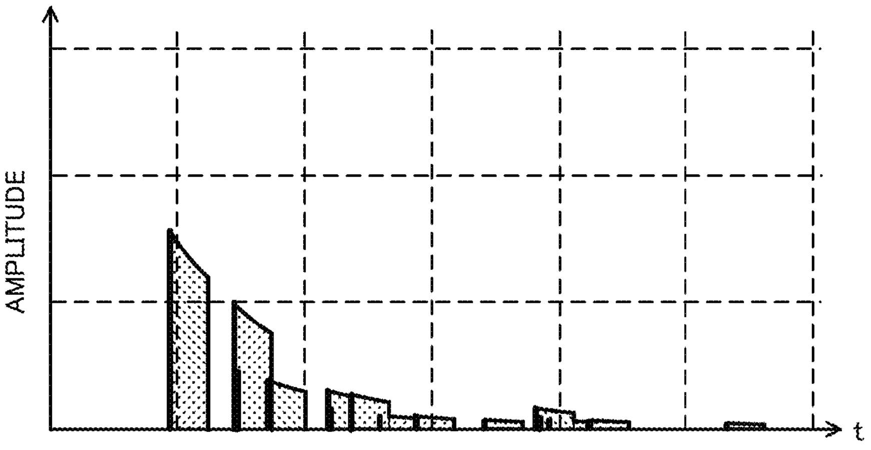
FIG. 21 is a view showing a waveform of an initial reflected sound control signal generated by an initial reflected sound control signal generator.

Then, the initial reflected sound control signal generator 50 performs the processing of the FIR filters 511 to 518 by use of each of the LDtaps 521 to 528. Therefore, the initial reflected sound control signal generator 50 has a high resolution on the time axis, and is able to generate initial reflected sound control signals ER1 to ER64 with more various tones. FIG. 21 is a view showing an image of a waveform of an initial reflected sound control signal generated by the initial reflected sound control signal generator 50.

As shown in FIG. 21, the initial reflected sound control signal generator 50, while keeping an initial reflected sound component by an imaginary sound source, is able to generate an initial reflected sound control signal having a higher resolution and enabling to correspond to various tones. Therefore, the audio signal processing apparatus 10, while keeping clear sound image localization by the initial reflected sound using the imaginary sound source, is able to obtain an initial reflected sound of a tone according to preference of a user.

In addition, for example, in a case of a short pulse sound of a sound source, with only the initial reflection sound component by the LDtap, the initial reflected sound control signal may become rough and causes unnaturalness in a tone. However, the resolution of the FIR filter is high, so that the audio signal processing apparatus 10 is able to significantly reduce roughness of such an initial reflected sound or unnaturalness of a tone.

In addition, in the above configuration, the initial reflected sound control signal generator 50 sets an assigned region assigned to the imaginary sound source IS for each speaker SP, and does not assign the imaginary sound source IS outside this region to this speaker SP. As a result, the initial reflected sound control signal generator 50 is able to significantly reduce excessive generation of the initial reflected sound component. Therefore, the audio signal processing apparatus 10 is able to significantly reduce excessive generation of the initial reflected sound, and obtain a natural initial reflected sound according to the virtual space.

[Generation of Reverberant Sound Control Signal]

Figure 22:
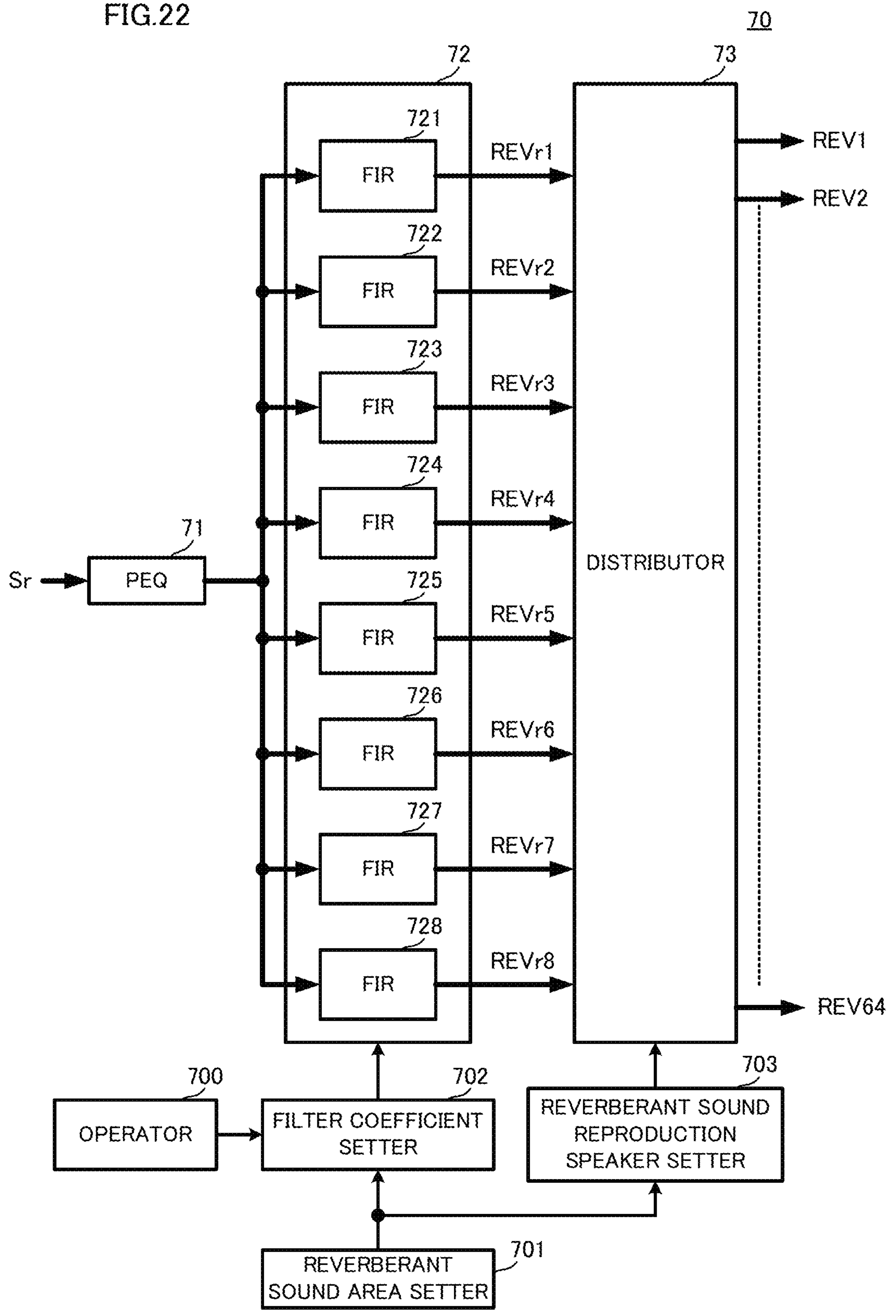
FIG. 22 is a functional block diagram showing an example of a configuration of a reverberant sound control signal generator.
Figure 23:
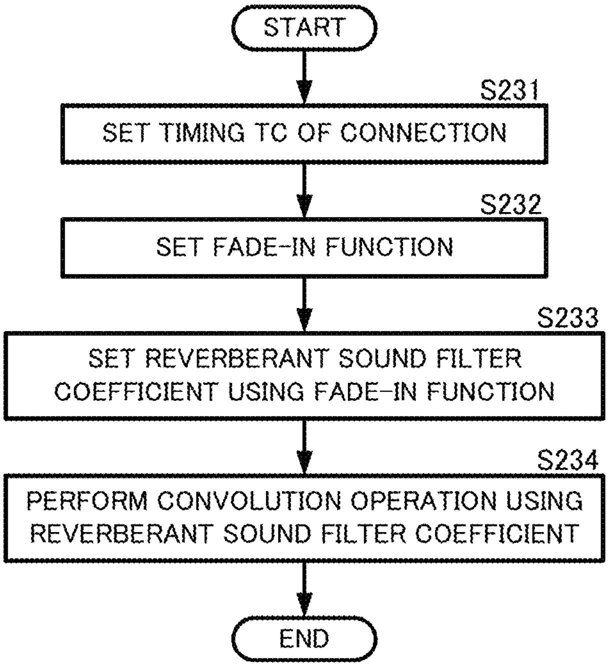
FIG. 23 is a flow chart showing an example of processing of generating a reverberant sound control signal.

FIG. 22 is a functional block diagram showing an example of a configuration of a reverberant sound control signal generator 70. FIG. 23 is a flow chart showing an example of processing of generating a reverberant sound control signal.

As shown in FIG. 22, the reverberant sound control signal generator 70 includes a PEQ 71, a FIR filter circuit 72, a distributor(router) 73, a reverberant sound area setter 701, a filter coefficient setter 702, a reverberant sound reproduction speaker setter 703, and an operator 700. The FIR filter circuit 72 includes a plurality of FIR filters 721 to 728.

The reverberant sound area setter 701 sets a plurality of reverberant sound areas Arr1 to Arr8, in a reproduction space. More specifically, the reverberant sound area setter 701 makes a setting so as to divide the reproduction space into the plurality of reverberant sound areas Arr1 to Arr8 over all circumferences on a plane, for example, with reference to a center point Psr of the reproduction space (see FIG. 25 to be described below).

The reverberant sound area setter 701 outputs coordinate information indicating the plurality of reverberant sound areas Arr1 to Arr8, to the filter coefficient setter 702 and the reverberant sound reproduction speaker setter 703.

The filter coefficient setter 702 sets a reverberant sound filter coefficient by an operation of a user, or the like. The reverberant sound filter coefficient is set by a measured result of an impulse response of a different space (a virtual space) to be reproduced in the reproduction space, for example. It is to be noted that the reverberant sound filter coefficient may be set in a simulated manner by use of the geometrical shape of the virtual space, a material of the wall surface, or the like. In such a case, the filter coefficient setter 702 sets a filter coefficient for each reverberant sound area Arr1 to Arr8 by use of the coordinate information for each reverberant sound area Arr1 to Arr8.

The filter coefficient setter 702 mainly receives an input of a volume of the virtual space and a surface area of the virtual space by an operation of a user, or the like. The filter coefficient setter 702 sets a fade-in function with respect to the reverberant sound filter coefficient, from a parameter such as a volume of the virtual space and a surface area of the virtual space.

More specifically, the filter coefficient setter 702 calculates a mean free path p by use of the volume V of the virtual space, and the surface area S of the virtual space. The calculation formula of the mean free path ρ is ρ=4V/S. The mean free path is an average propagation distance over which a sound travels from a reflection on a wall surface to the next reflection, in an enclosed space. The mean free path is divided by a sound velocity c0, so that an average time required from when a sound is reflected on a wall surface to when the sound is reflected again is able to be calculated.

The filter coefficient setter 702 sets timing tc of connection from the mean free path ρ (S231 in FIG. 23). Specifically, the filter coefficient setter 702 sets timing tc of connection by use of a mean free path ρ, a sound velocity c0, and an order n of reflection. The calculation formula of the timing tc of connection is tc=ρ×n/c0.

As shown in this calculation formula, the timing tc of connection corresponds to the average time required for n reflections in the virtual space, and corresponds to a time when a sound starts shifting to a reverberant sound in the virtual space in a case in which the n-th initial reflected sound is reproduced. In other words, the timing tc of connection corresponds to timing when a component of the initial reflected sound control signal by the above initial reflected sound control signal generator 50 is lost.

By performing such processing, the filter coefficient setter 702 is able to optimally set the timing tc of connection between the initial reflected sound and the reverberant sound according to the geometrical shape of the virtual space.

The filter coefficient setter 702 sets a fade-in function from the following formula by use of the timing tc of connection (S232 in FIG. 23).

$$fin = e^{-K\left(1-\frac{t}{tc}\right)} \quad \text{[Mathematical Formula 1]}$$

It is to be noted that, in this formula, t indicates an elapsed time from when a direct sound is generated, and K is set from the following formula.

$$K = \log 10^{\frac{GREV}{20}} \quad \text{[Mathematical Formula 2]}$$

Moreover, in this formula, GREV is a gain value of the reverberant sound at time 1=0 and is able to be set by a user, and, since reverberation time is generally a time required for a sound to decay to −60 dB, for example, GREV=−60 dB may be set.

The filter coefficient setter 702 sets a reverberant sound filter coefficient from the filter coefficient and the fade-in function fin (S233 in FIG. 23), and outputs the reverberant sound filter coefficient, to the plurality of FIR filters 721 to 728.

The reverberant sound generation signal Sr outputted from the mixer 60 is inputted to the PEQ 71. The PEQ71 performs predetermined signal processing on the reverberant sound generation signal Sr, and outputs the signal to the plurality of FIR filters 721 to 728.

The signal processing is performed by the PEQ 71, so that a level (a magnitude of a signal) of the reverberant sound generation signal Sr, a tone, and the like are able to be adjusted. For example, the PEQ 71 refers to the volume of an initial reflected sound control signal or the like, and is able to adjust the level (the magnitude of a signal) of the reverberant sound generation signal Sr so that the volume of the initial reflected sound and the volume of the reverberant sound may be at the same level at the timing tc of connection described above. In addition, the PEQ 71 is able to adjust a tone and the like according to a setting by a user or the like.

The plurality of FIR filters 721 to 728 perform filter processing on the reverberant sound generation signal Sr by use of the reverberant sound filter coefficient, and generate area-specific reverberant sound control signals REVr1 to REVr8. For example, the FIR filter 721 performs a convolution operation to the reverberant sound generation signal Sr by use of the reverberant sound filter coefficient set for the reverberant sound area Arr1, and generates an area-specific reverberant sound control signal REVr1 for the area Arr1. Similarly, the FIR filters 722 to 728 use the reverberant sound filter coefficient set for each of the reverberant sound areas Arr2 to Arr8 and perform a convolution operation to the reverberant sound generation signal Sr, and generate area-specific reverberant sound control signals REVr2 to REVr8 for the areas Arr2 to Arr8 (S234 in FIG. 23). The plurality of FIR filters 721 to 728 output the area-specific reverberant sound control signals REVr1 to REVr8 to the distributor 73.

Figure 24:
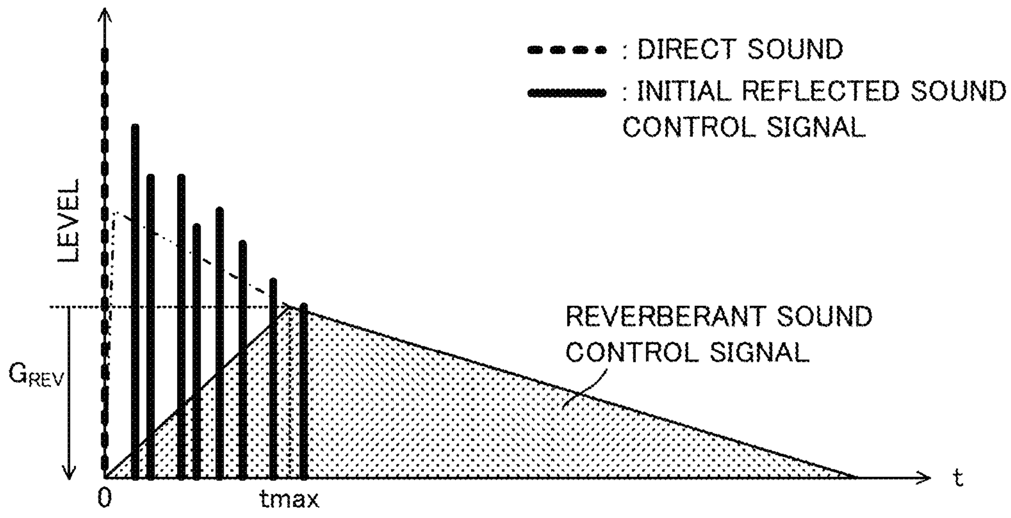
FIG. 24 is a graph showing an example of a waveform of a direct sound, an initial reflected sound control signal, and a reverberant sound control signal.

The set fade-in function described above causes the reverberant sound control signal to become a waveform as shown in FIG. 24. FIG. 24 is a graph showing an example of a waveform of a direct sound, an initial reflected sound control signal, and a reverberant sound control signal. It is to be noted that, in FIG. 24, for convenience, a reverberant sound control signal is indicated by an envelope of each time component. In addition, the vertical axis in FIG. 24 indicates dB.

As shown in FIG. 24, a signal level of the reverberant sound control signal is gradually increased according to the fade-in function over from timing of outputting a direct sound to the timing tc of connection. More specifically, the signal level of the reverberant sound control signal is −60 dBFs at the timing of outputting a direct sound, gradually increases to the timing tc of connection, and reaches 0 dBFs at the timing tc of connection. This level is set based on the signal level of the timing tc of connection of the initial reflected sound control signal.

In the example of FIG. 24, by use of the fade-in function described above, the signal level is exponentially increased as approaching the timing tc of connection. In other words, the fade-in function described above has reverse characteristics to a decay curve of the reverberant sound control signal on which fade-in processing is not performed. It is to be noted that the characteristics of a change in the level of the reverberant sound control signal by the fade-in processing are not limited to this, and a user or others are able to set desired characteristics by appropriately setting the fade-in function.

By performing such processing, the reverberant sound control signal generator 70 is able to generate the reverberant sound control signal that reproduces the reverberant sound in the virtual space with good accuracy, by use of the FIR filters 721 to 728. In addition, the signal level of the reverberant sound control signal is gradually increased in a section in which the initial reflected sound control signal exists, reaches a peak value according to a signal level of the initial reflected sound control signal at the timing tc of connection, and then decays.

As a result, the audio signal processing apparatus 10 is able to smooth the connection between the initial reflected sound control signal and the reverberant sound control signal that are generated by the plurality of LDtaps reproducing imaginary sound source distribution at a plurality of sound source positions in the virtual space. Therefore, the sound that is outputted from the audio signal processing apparatus 10 and listened to by a user becomes a sound with significantly reduced discomfort at the time of the connection from the initial reflected sound to the reverberant sound.

The reverberant sound reproduction speaker setter 703 groups the plurality of speakers SP1 to SP64 in the reverberant sound areas Arr1 to Arr8.

More specifically, the reverberant sound reproduction speaker setter 703 divides the reproduction space into the plurality of reverberant sound areas Arr1 to Arr8 over all circumferences on a plane, for example, with reference to the center point Psr of the reproduction space. The reverberant sound reproduction speaker setter 703 performs grouping of the plurality of speakers SP1 to SP64 with respect to the plurality of reverberant sound areas Arr1 to Arr8 by use of the position coordinates of the plurality of speakers SP1 to SP64, and the coordinate information indicating the plurality of reverberant sound areas Arr1 to Arr8. This grouping is able to be implemented in the same manner as the grouping of the sound sources OBJ described above.

Figure 25:
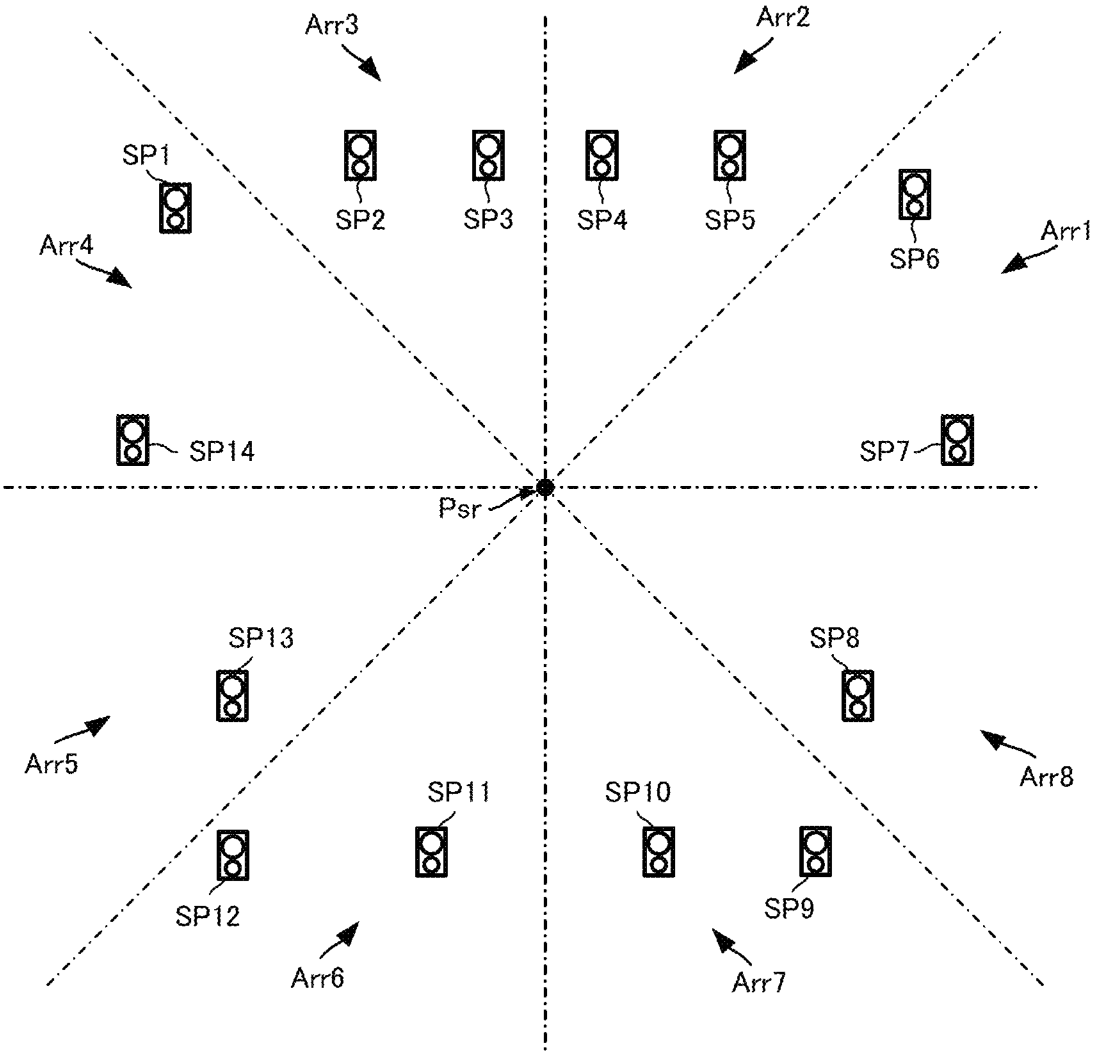
FIG. 25 is a view showing an example of setting an area for a reverberant sound.

FIG. 25 is a view showing an example of setting an area for a reverberant sound. FIG. 25 shows the plurality of speakers SP1 to SP14 in order to simplify and facilitate a description. For example, the reverberant sound reproduction speaker setter 703, as shown in FIG. 25, detects that the speaker SP6 and the speaker SP7 are in the reverberant sound area Arr1, and groups the speaker SP6 and the speaker SP7 in the reverberant sound area Arr1. Similarly, the reverberant sound reproduction speaker setter 703 also groups other speakers SP1 to SP5 and SP8 to SP14 in each of the plurality of reverberant sound areas Arr2 to Arr8.

The reverberant sound reproduction speaker setter 703 outputs grouping information on the plurality of speakers SP1 to SP64 with respect to the plurality of reverberant sound areas Arr2 to Arr8, to the distributor 73.

The distributor 73 assigns the area-specific reverberant sound control signals REVr1 to REVr8, to the plurality of speakers SP1 to SP64 by use of the grouping information from the reverberant sound reproduction speaker setter 703. The distributor 73, based on assignment, outputs the area-specific reverberant sound control signals REVr1 to REVr8 as reverberant sound control signals REV1 to REV48 for each of the plurality of speakers SP1 to SP64.

For example, the distributor 73 extracts information that the speaker SP6 and the speaker SP7 are grouped in the area Arr1, from the grouping information. The distributor 73 assigns the area-specific reverberant sound control signal REVr1 of the area Arr1 to the speaker SP6 and the speaker SP7. The distributor 73 outputs the area-specific reverberant sound control signal REVr1 to the speaker SP6 as a reverberant sound control signal REV6 for the speaker SP6. In addition, the distributor 73 outputs the area-specific reverberant sound control signal REVr1 to the speaker SP7 as a reverberant sound control signal REV7 for the speaker SP7.

By such processing of assigning the reverberant sound control signals REVr1 to REVr8 for each area by the distributor 73, the reverberant sound control signal generator 70 is able to output the optimal reverberant sound control signal to each of the plurality of speakers SP1 to SP64 according to arrangement of the plurality of speakers SP1 to SP64.

[Output Adjustment]

Figure 26:
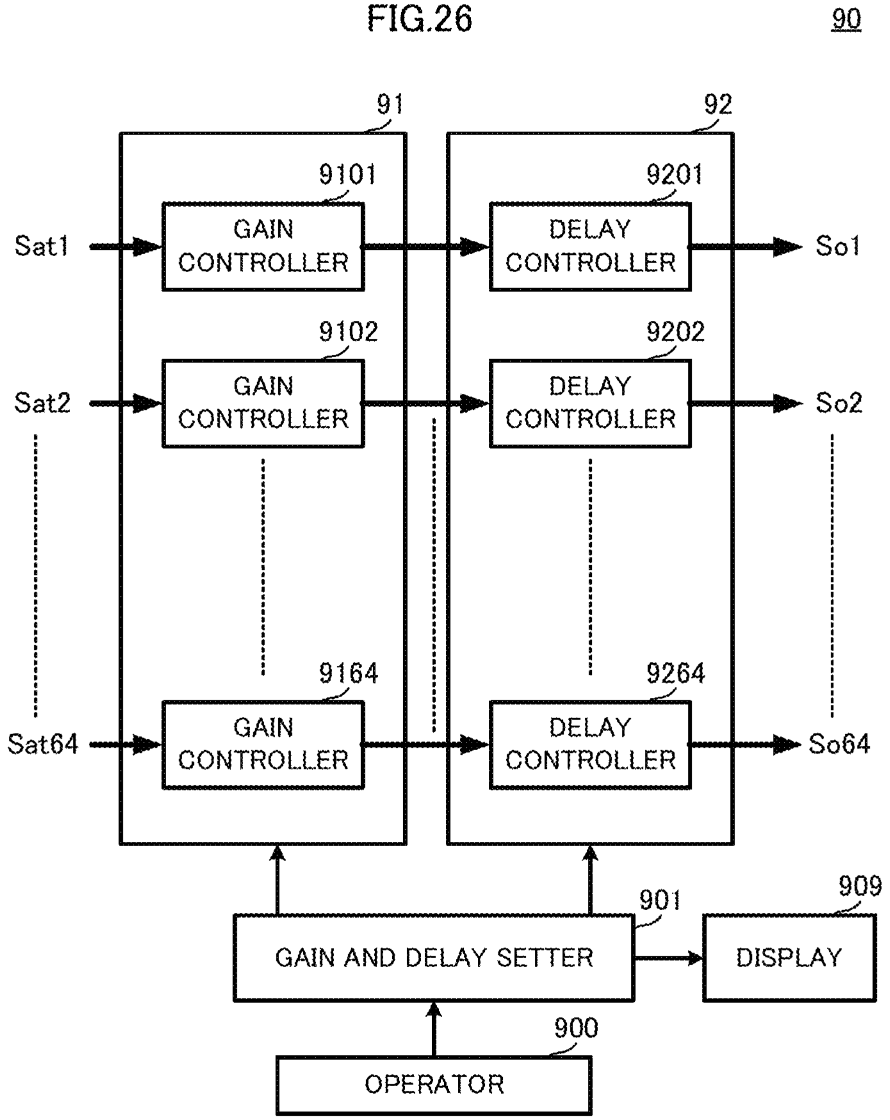
FIG. 26 is a functional block diagram showing an example of a configuration of an output adjuster.
Figure 27:
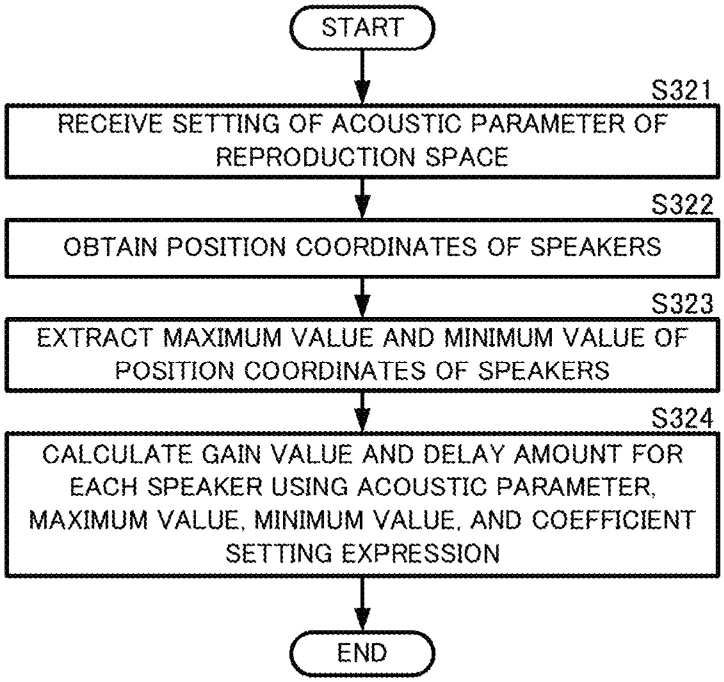
FIG. 27 is a flow chart showing an example of output adjustment processing.

FIG. 26 is a functional block diagram showing an example of a configuration of the output adjuster 90. FIG. 27 is a flow chart showing an example of output adjustment processing.

As shown in FIG. 26, the output adjuster 90 includes a gain controller 91, a delay controller 92, a gain and delay setter 901, an operator 900, and a display 909. The gain controller 91 includes a plurality of gain controllers 9101 to 9164 corresponding to the plurality of speakers SP1 to SP64. The delay controller 92 includes a plurality of delay controllers 9201 to 9264 corresponding to the plurality of speakers SP1 to SP64.

The operator 900 receives a setting of the acoustic parameter of the reproduction space by an operation input from a user (S321 in FIG. 27). The acoustic parameter of the reproduction space is a parameter to reproduce a desired sound field in the reproduction space.

In such a case, the acoustic parameter of the reproduction space includes a weight value and a shape value. A weight is not a gain value or a delay amount of each of the plurality of speakers SP1 to SP64, but indicating weighting of a sound in a predetermined direction of the reproduction space, and a weight value is a value of this weighting. A shape is indicating expansion of a sound in a predetermined direction of the reproduction space, and a shape value is a value of this expansion.

The weight value is configured by a gain value and a delay amount, and includes a weight value at a position in a front-rear direction of the reproduction space, a weight value at a position in a left-right direction of the reproduction space, and a weight value at a position in an up-down direction of the reproduction space. The shape value is configured by a gain value and a delay amount, and includes a shape value in a lateral direction (a left-right direction).

Figure 28:
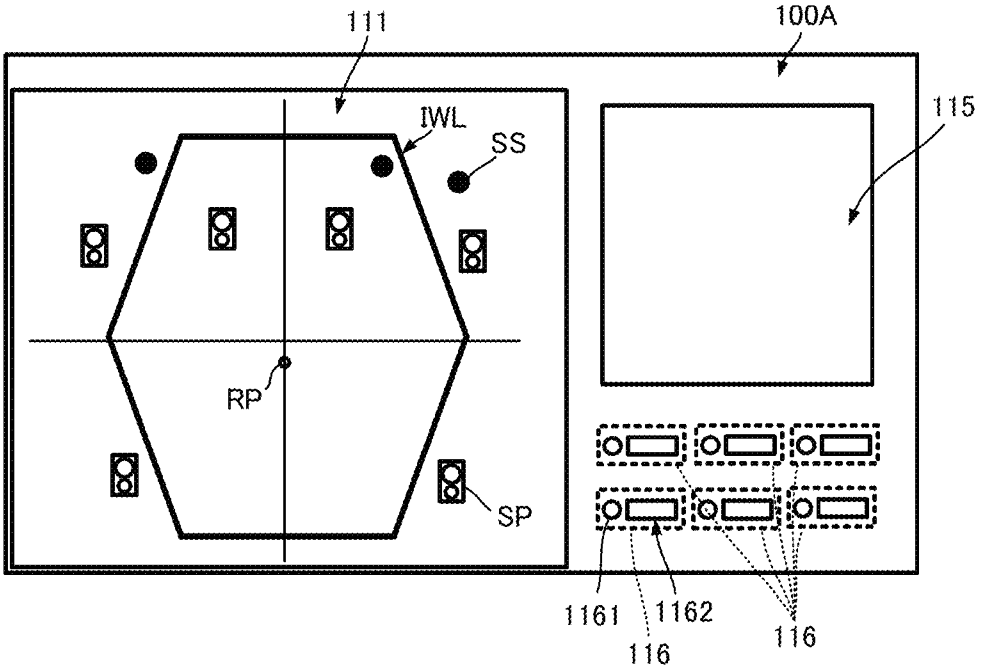
FIG. 28 is a view showing an example of a GUI for output adjustment.

The display 909 includes a GUI. FIG. 28 is a view showing an example of the GUI for output adjustment.

As shown in FIG. 28, a GUI 100A includes a setting display window 111, an output state display window 115, and a plurality of physical controllers 116. The plurality of physical controllers 116 include a knob 1161 and an adjustment value display window 1162.

The plurality of physical controllers 116 are physical controllers to set a weight value and a shape value, and the like. Each of the physical controllers 116 for weight value includes a physical controller 116 to set left-right weight, front-rear weight, and up-down weight. Each of the physical controllers 116 for weight value includes a physical controller to set a gain value, and a physical controller to set a delay amount. The physical controllers 116 for shape value include a physical controller to set expansion. Each of the physical controller 116 for shape value includes a physical controller to set a gain value, and a physical controller to set a delay amount.

The output state display window 115 graphically and schematically displays expansion and a sense of localization of a sound that are obtained by the weight value and the shape value that are set by the plurality of physical controllers 116. As a result, a user can easily recognize expansion and a sense of localization of a sound that are set by the plurality of physical controllers 116, as an image.

A user sets an acoustic parameter (a weight value and a delay amount) desiring to reproduce by using the GUI 100A of this display 909. The operator 900 receives a setting using the GUI 100A. The operator 900 outputs this setting content (each weight value and each delay amount of the acoustic parameter) to the gain and delay setter 901.

The gain and delay setter 901 sets a gain value and a delay amount to the plurality of speakers SP1 to SP64, based on each weight value and each delay amount of the acoustic parameter. More specifically, the gain and delay setter 901 performs the following processing.

The gain and delay setter 901 obtains position coordinates of the plurality of speakers SP1 to SP64 arranged in the reproduction space (S322). A position coordinate, for example, is represented by a coordinate system in which an x axis is set in the left-right direction of the reproduction space, a y axis is set in the front-rear direction of the reproduction space, and a z axis is set in the up-down direction.

The gain and delay setter 901 extracts the maximum value and the minimum value of the position coordinates of the plurality of speakers SP1 to SP64 in each axis direction (S323).

The gain and delay setter 901 stores a coefficient setting formula. The coefficient setting formula includes, for example, a weight coefficient setting formula to set weighting in a predetermined direction of the reproduction space, and a shape coefficient setting formula to set expansion in a predetermined direction of the reproduction space.

The weight coefficient setting formula includes a setting formula for a weight gain value, and a setting formula for a weight delay amount. The shape coefficient setting formula includes a setting formula for a shape gain value, and a setting formula for a shape delay amount.

The weight coefficient setting formula includes a front-rear direction coefficient setting formula to set weighting in the front-rear direction of the reproduction space, a left-right direction coefficient setting formula to set weighting in the front-rear direction of the reproduction space, and an up-down coefficient setting formula to set weighting in the up-down direction of the reproduction space.

The shape coefficient setting formula includes a coefficient setting formula for a predetermined direction (the left-right direction, for example) to set expansion in a predetermined direction of the reproduction space.

A coefficient setting formula for a weight gain value is, for example, a linear function that combines a gain value of a set weight value, the extracted maximum value and minimum value of the position coordinates, and the position coordinate of a speaker (a speaker to be set) to which the gain value is set, and a formula by which the gain value is determined in proportion to a difference between the position coordinate of the speaker to be set and the minimum value of the position coordinate.

A coefficient setting formula for a weight delay amount is, for example, a linear function that combines a delay amount of a set weight value, the extracted maximum value and minimum value of the position coordinates, and the position coordinate of a speaker (a speaker to be set) to which the delay amount is set, and a formula by which the delay amount is determined in proportion to a difference between the position coordinate of the speaker to be set and the minimum value of the position coordinate.

A coefficient setting formula for a shape gain value is, for example, a linear function that combines a gain value of a set shape value, the extracted maximum value and minimum value of the position coordinates, and the position coordinate of a speaker (a speaker to be set) to which the gain value is set, and a formula by which the gain value is determined in proportion to a difference between the position coordinate of the speaker to be set and the minimum value of the position coordinate.

A coefficient setting formula for a shape delay amount is, for example, a linear function that combines a delay amount of a set shape value, the extracted maximum value and minimum value of the position coordinates, and the position coordinate of a speaker (a speaker to be set) to which the delay amount is set, and a formula by which the delay amount is determined in proportion to a difference between the position coordinate of the speaker to be set and the minimum value of the position coordinate.

The gain and delay setter 901 calculates a gain value and a delay amount for each speaker to be set by use of the set gain value and delay amount (the acoustic parameter), the extracted maximum value and minimum value of the position coordinates, and the coefficient setting formula (S324).

By using such processing, the gain and delay setter 901 is able to automatically calculate and set a gain value and a delay amount of the plurality of speakers SP1 to SP64 disposed in the reproduction space, by the coefficient setting formula, without individually and manually setting the gain value and the delay amount.

The gain and delay setter 901 outputs the gain value set for each of the plurality of speakers SP1 to SP64, to the plurality of gain controllers 9101 to 9164. The gain and delay setter 901 outputs the delay amount set for each of the plurality of speakers SP1 to SP64, to the plurality of gain controllers 9201 to 9264.

The plurality of gain controllers 9101 to 9164 respectively receive inputs of the speaker signals Sat1 to Sat64 corresponding to the plurality of speakers SP1 to SP64, from the adder 80.

The plurality of gain controllers 9101 to 9164 control signal levels of the speaker signals Sat1 to Sat64 by use of the gain value set to each, and output the signals to the plurality of delay controllers 9201 to 9264. For example, the gain controller 9101 controls the signal level of the speaker signal Sat1 by use of the gain value set to the gain controller 9101, and outputs the signal to the delay controller 9201. Similarly, the gain controllers 9102 to 9164 control the signal levels of the speaker signals Sat2 to Sat64 by use of the gain value set to each of the gain controllers 9102 to 9164, and output the signals to the delay controllers 9202 to 9264.

The plurality of delay controllers 9201 to 9264 control signal levels of the signals inputted from the plurality of gain controllers 9101 to 9164 by use of the delay amount set to each, and output the signals to the plurality of speakers SP1 to SP64. For example, the delay controller 9201 controls the signal level of the signal inputted from the gain controller 9101 by use of the delay amount set to the delay controller 9201, and outputs the signal to the speaker SP1. Similarly, the delay controllers 9202 to 9264 control the signal level of the signals inputted from the gain controllers 9102 to 9164 by use of the delay amount set to each of the delay controllers 9202 to 9264, and output the signals to the speakers SP2 to SP64.

By such a configuration, the audio signal processing apparatus 10 is able to easily achieve a desired sound field corresponding to the set acoustic parameter by use of the initial reflected sound control signal and the reverberant sound control signal, without forcing a user to make complicated settings individually for a plurality of speakers. As a result, for example, the audio signal processing apparatus 10 is able to easily achieve a sound field that is able to obtain the Haas effect with respect to a predetermined position in the reproduction space.

(Example to Achieve Sound Field by Output Control)

Figure 29A:
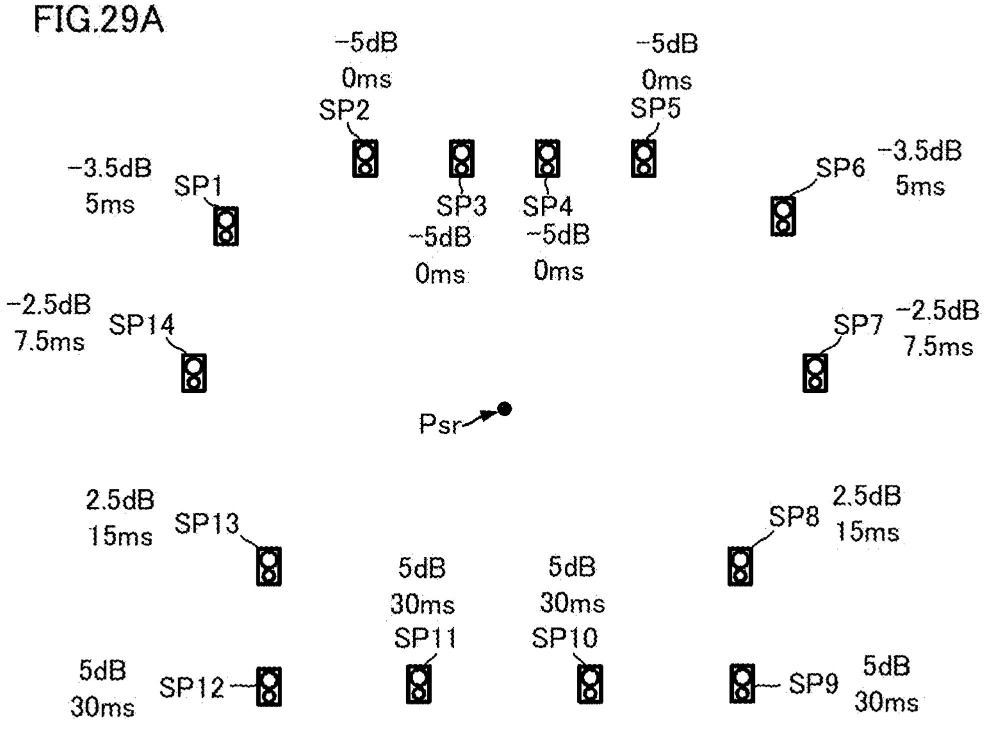
FIG. 29A and FIG. 29B are views showing a setting example in a case in which a sound is localized and expanded to a rear of a reproduction space.
Figure 29B:
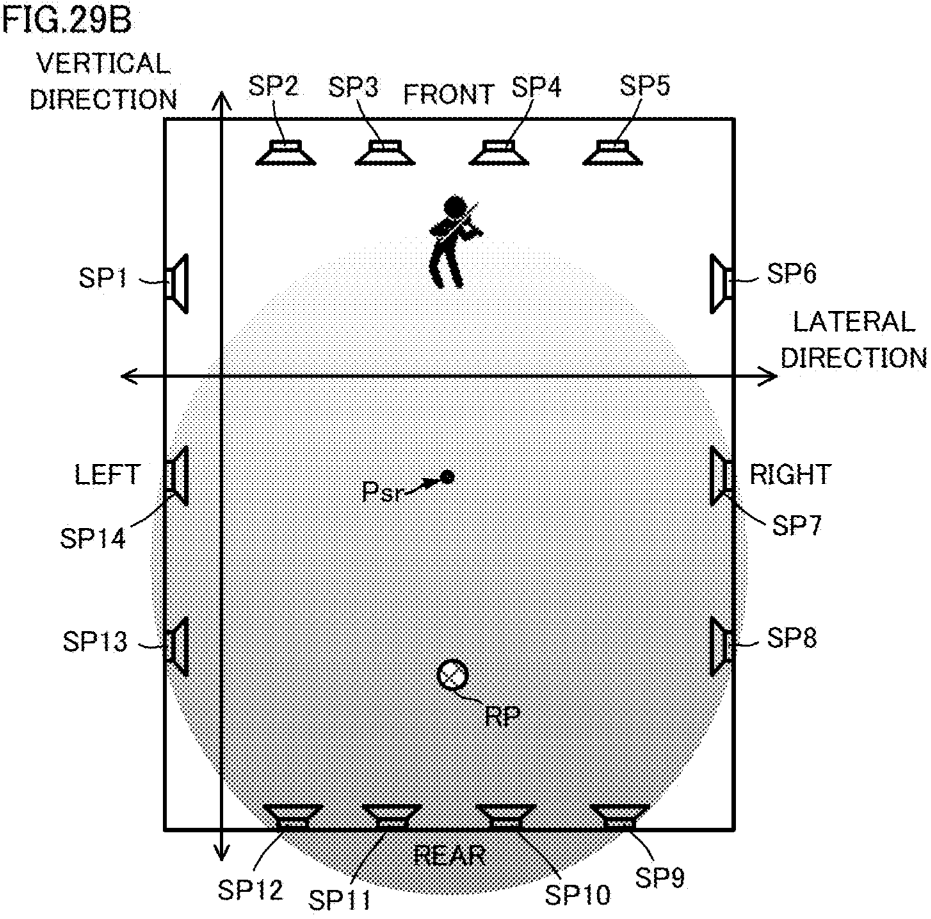

FIG. 29A and FIG. 29B are views showing a setting example in a case in which a sound is localized and expanded to a rear of a reproduction space. FIG. 29A is a view showing an example of setting of a gain value and delay amount, and FIG. 29B is a view showing an image of weighing a sound by the setting of FIG. 29A. It is to be noted that FIG. 29A and FIG. 29B show a case in which 14 speakers SP1 to SP14 are disposed, in order to simplify and facilitate a description.

In the aspect shown in FIG. 29A and FIG. 29B, a gain value and a delay amount at a rear end are set as an acoustic parameter, for example. The gain and delay setter 901 sets a gain value and a delay amount of a front end to a reverse coded value of the gain value and the delay amount at a rear end. The gain and delay setter 901 calculates the maximum value and the minimum value of the position coordinates of the 14 speakers SP1 to SP14.

The gain and delay setter 901 calculates a gain value of the 14 speakers SP1 to SP14 by use of gain values at the rear end and the front end, the maximum value and the minimum value of the position coordinates of the 14 speakers SP1 to SP14, the front-rear direction coefficient setting formula (for setting a gain value) to set weighting in the front-rear direction of the reproduction space.

In addition, the gain and delay setter 901 calculates a delay amount of the 14 speakers SP1 to SP14 by use of delay amounts at the rear end and the front end, the maximum value and the minimum value of the position coordinates of the 14 speakers SP1 to SP14, and the front-rear direction coefficient setting formula (for setting a delay amount) to set weighting in the front-rear direction of the reproduction space.

By such processing, the audio signal processing apparatus 10, as shown in FIG. 29A, is able to automatically and easily set such an acoustic parameter that a speaker located closer to the rear of the reproduction space may have larger gain value and delay amount and a speaker located closer to the front of the reproduction space may have smaller gain value and delay amount. As a result, the audio signal processing apparatus 10 is able to easily achieve a sound field in which the rear of the reproduction space is expanded and sound vibrations are localized (see FIG. 29B).

Moreover, although this description shows the example in the front-rear direction, the audio signal processing apparatus 10 is able to achieve a weighted sound field similarly in the left-right direction and the height direction (the up-down direction).

Figure 30A:
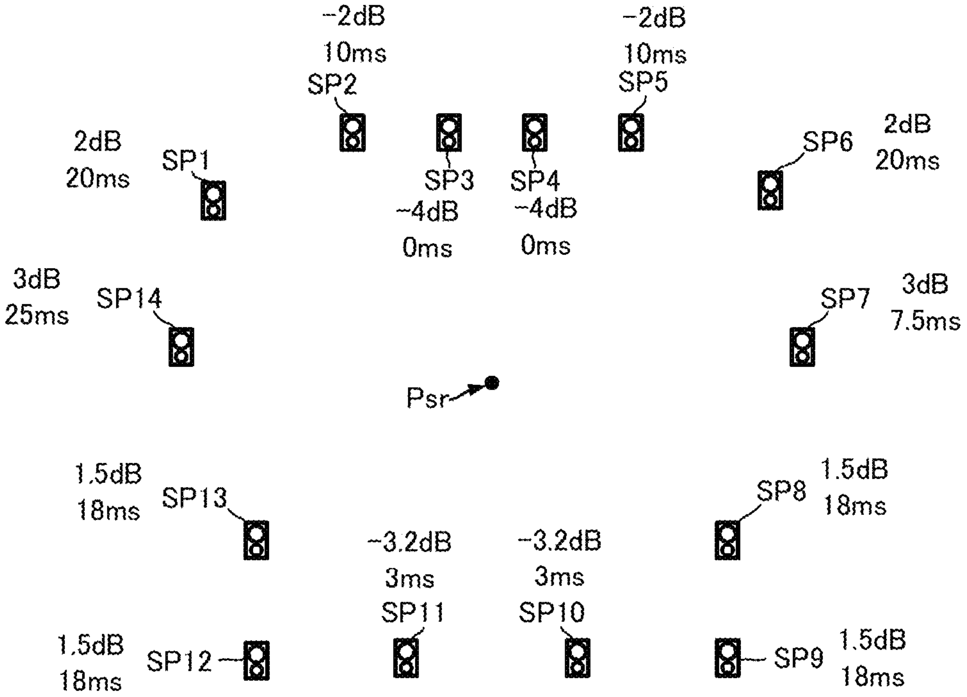
FIG. 30A and FIG. 30B are views showing a setting example in a case in which a sound is localized and expanded in a lateral direction of the reproduction space.
Figure 30B:
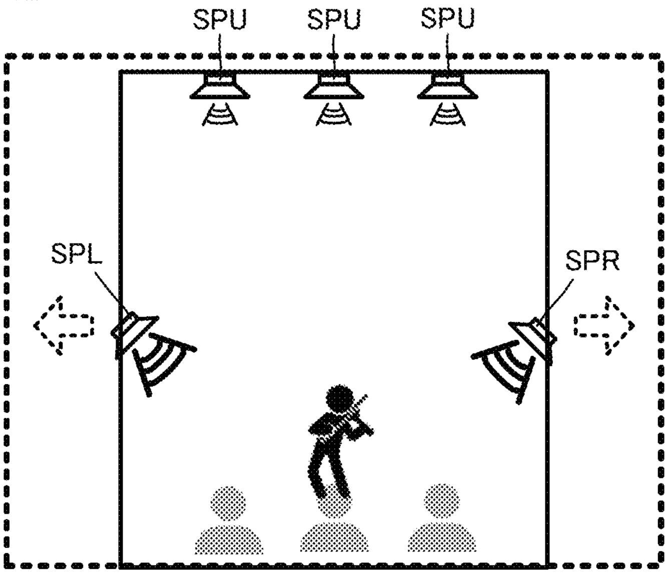

FIG. 30A and FIG. 30B are views showing a setting example in a case in which a sound is expanded in the lateral direction (the left-right direction) of the reproduction space. FIG. 30A is a view showing an example of setting of a gain value and delay amount, and FIG. 30B is a view showing an image of expanding a sound by the setting of FIG. 30A. It is to be noted that FIG. 30A and FIG. 30B show a case in which 14 speakers SP1 to SP14 are disposed, in order to simplify and facilitate a description.

In the aspect shown in FIG. 30A and FIG. 30B, a value (an expansion setting value) obtained by quantifying expansion of a sound is set as an acoustic parameter, for example. The gain and delay setter 901 calculates the maximum value and the minimum value of the position coordinates of the 14 speakers SP1 to SP14.

The gain and delay setter 901 calculates a gain value of the 14 speakers SP1 to SP14 by use of the expansion setting value, the maximum value and the minimum value of the position coordinates of the 14 speakers SP1 to SP14, and the shape coefficient setting formula (for setting a gain value).

In addition, the gain and delay setter 901 calculates a delay amount of the 14 speakers SP1 to SP14 by use of delay amounts at the rear end and the front end, the maximum value and the minimum value of the position coordinates of the 14 speakers SP1 to SP14, and the shape coefficient setting formula (for setting a delay amount).

By such processing, the audio signal processing apparatus 10, as shown in FIG. 30A, is able to automatically and easily set such an acoustic parameter that a speaker located closer to both ends of the reproduction space in the lateral direction may have larger gain value and delay amount and a speaker located closer to the center of the reproduction space in the lateral direction may have smaller gain value and delay amount. As a result, the audio signal processing apparatus 10 is able to easily achieve a sound field in which the reproduction space is expanded in the lateral direction and sound vibrations are localized (see FIG. 30B).

Figure 31:
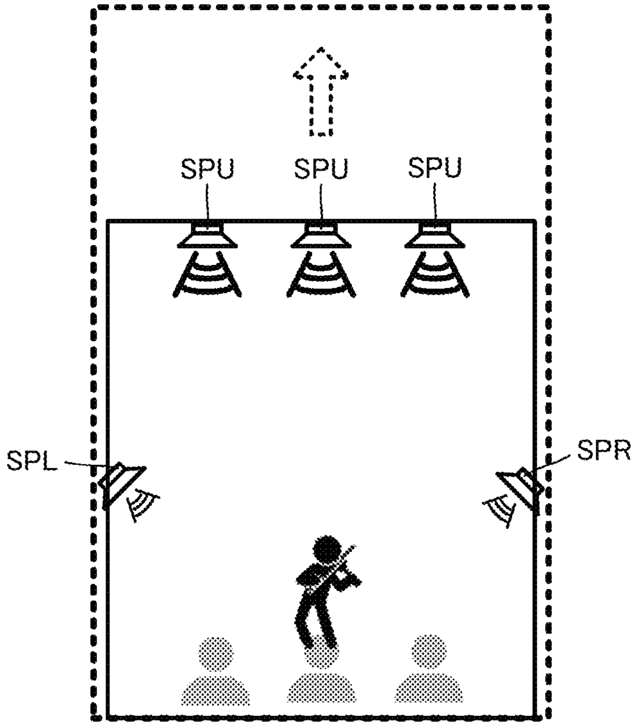
FIG. 31 is a view showing an image of expansion of a sound in a case in which the sound is expanded in a height direction.

Moreover, the audio signal processing apparatus 10, by simply setting the acoustic parameter described above, is able to achieve not only the weighting in the front-rear direction of the reproduction space, the weighting in the left-right direction of the reproduction space, and the expansion in the lateral direction of the reproduction space, but also weighting and expansion in the height direction (the up-down direction) of the reproduction space. For example, FIG. 31 is a view showing an image of expansion of a sound in a case in which the sound is expanded in the height direction.

The audio signal processing apparatus 10 makes a gain value and delay amount of a speaker SPU near the ceiling larger than a gain value and delay amount of speakers SPL and SPR near a floor surface. As a result, the audio signal processing apparatus 10 is able to easily achieve a sound field in which the reproduction space has more expansion in a ceiling direction and sound vibrations are localized (see FIG. 31).

In addition, in the above configuration, the output adjuster 90 outputs the output signals So1 to So64 to the plurality of speakers SP1 to SP64. However, the audio signal processing apparatus may perform binaural processing on the output signals So1 to So64 and then output the signals.

Figure 32:
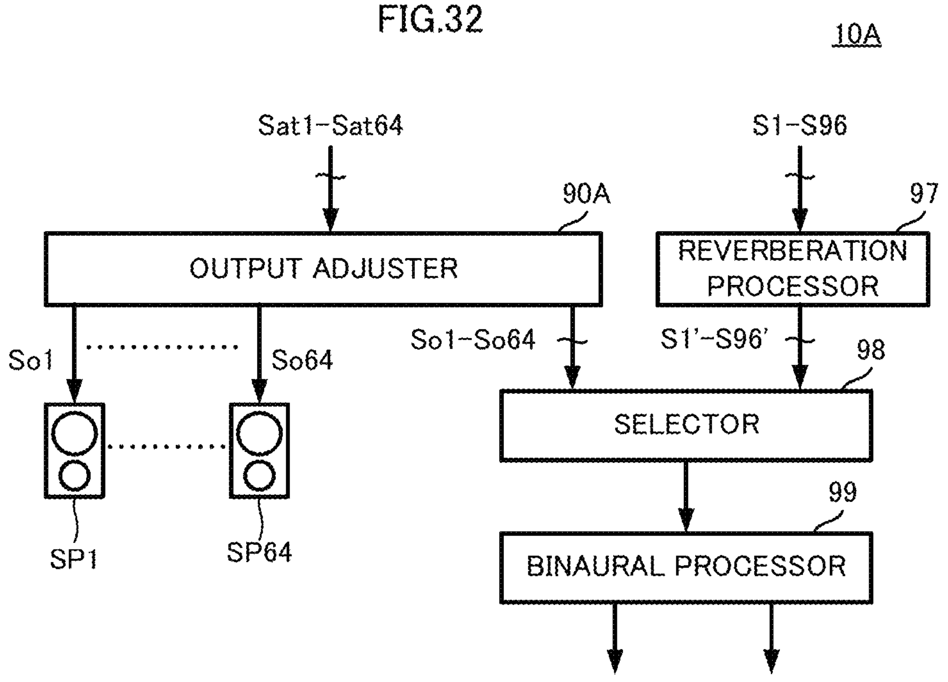
FIG. 32 is a functional block diagram showing a configuration of an audio signal processing apparatus with a binaural reproduction function.

FIG. 32 is a functional block diagram showing a configuration of an audio signal processing apparatus with a binaural reproduction function. As shown in FIG. 32, the audio signal processing apparatus 10A with a binaural reproduction function is different from the above audio signal processing apparatus 10 in that an output adjuster 90A, a reverberation processor 97, a selector 98, and a binaural processor 99 are provided.

The output adjuster 90A generates a plurality of output signals So1 to So64 from the plurality of speaker signals Sat1 to Sat64 outputted from the adder 80 by use of the same processing as the above output adjuster 90.

The output adjuster 90A is able to select an output target. A selection of an output target is executed by an operation input from a user using the above GUI, for example. More specifically, the GUI displays a physical controller capable of selecting between a speaker output and a binaural output, and this physical controller is operated to select the output target.

In a case in which the speaker output is selected, the output adjuster 90A respectively outputs the plurality of output signals So1 to So64 to the plurality of speakers SP1 to SP64 (the same as processing performed by the output adjuster 90). In a case in which the binaural output is selected, the output adjuster 90A outputs the plurality of output signals So1 to So64 to the selector 98.

Audio signals S1 to S96 of a plurality of sound sources OBJ1 to OBJ96 are inputted to the reverberation processor 97. The reverberation processor 97 adds an initial reflected sound control signal and a reverberant sound control signal to the plurality of audio signals S1 to S96, and outputs the signals to the selector 98. The initial reflected sound control signal to the plurality of audio signals S1 to S96 is set based on the position coordinate of the plurality of sound sources OBJ1 to OBJ96. The reverberation processor 97 outputs a plurality of audio signals S1' to S96' on which reverberation processing has been performed, to the selector 98.

The plurality of output signals So1 to So64 and the plurality of audio signals S to S96' on which the reverberation processing has been performed are inputted to the selector 98. The selector 98 selects the plurality of output signals So1 to So64 and the plurality of audio signals S1' to S96' on which the reverberation processing has been performed by an operation input from a user using the above GUI, for example. More specifically, the GUI displays a physical controller capable of selecting between a sound on which acoustic processing of the audio signal processing apparatus 10A has been performed and a sound on which virtual acoustic processing based on the position coordinates of the sound sources OBJ1 to OBJ96 has been performed. This physical controller is operated to select an output target.

In a case in which the sound on which acoustic processing of the audio signal processing apparatus 10A has been performed is selected, the selector 98 selects the plurality of output signals So1 to So64, and outputs the signals to the binaural processor 99. In a case in which the sound on which virtual acoustic processing based on the position coordinates of the sound sources OBJ1 to OBJ96 has been performed is selected, the selector 98 selects the plurality of audio signals S1' to S96' on which the reverberation processing has been performed, and outputs the signals to the binaural processor 99.

The binaural processor 99 performs binaural processing on an inputted audio signal. More specifically, when the plurality of output signals So1 to So64 are inputted, the binaural processor 99 performs the binaural processing on the plurality of output signals So1 to So64. When the plurality of audio signals S1' to S96' on which the reverberation processing has been performed are inputted, the binaural processor 99 performs the binaural processing on the plurality of audio signals S1' to S96' on which the reverberation processing has been performed.

It is to be noted that the binaural processing uses a head-related transfer function, and detailed content is known and a detailed description of the binaural processing will be omitted.

The binaural processor 99 outputs an audio signal of two channels on which the binaural processing has been performed.

As a result, the user can listen to the sound generated by the audio signal processing apparatus 10A, and the sound on which the virtual reverberation processing based on the position coordinates of the sound sources OBJ1 to OBJ96 by binaural reproduction. Therefore, the user can easily check by use of headphones, or the like whether the acoustic processing performed by the audio signal processing apparatus 10A is able to reproduce the acoustics of the virtual space without physically constructing the reproduction space. The acoustic processing performed by the audio signal processing apparatus 10A includes the grouping of the above sound sources, the setting of the initial reflected sound control signal, the setting of the reverberant sound control signal, the setting of output control, for example. Then, the user, by being able to listen to and compare, can adjust the setting of the above acoustic processing so as to more accurately reproduce the acoustics of the virtual space.

It is to be noted that the binaural reproduction may not be limited to the headphones and may be performed by a stereo speaker or the like.

The descriptions of the embodiments of the present disclosure are illustrative in all points and should not be construed to limit the present disclosure. The scope of the present disclosure is defined not by the foregoing embodiments but by the following claims for patent. Further, the scope of the present disclosure is intended to include all modifications within the scopes of the claims for patent and within the meanings and scopes of equivalents.

What is claimed is:

1. An audio signal processing method comprising:

dividing a virtual sound source representing a reflected sound of a target acoustic space into (i) a first virtual sound source located between a speaker and a sound receiving point, the first virtual sound source representing a first sound source of the reflected sound of the target acoustic space, and (ii) a second virtual sound source located such that the speaker is disposed between the second virtual sound source and the sound receiving point, the second virtual sound source representing a second sound source of the reflected sound of the target acoustic space;

moving, only in a case of the first virtual sound source, a position of the first virtual sound source to a reproducible position based on a position of the speaker; and setting a gain value and a delay amount to the first virtual sound source according to a difference between a first distance between the speaker and the sound receiving point and a second distance between the first virtual sound source after movement and the sound receiving point.

2. The audio signal processing method according to claim 1, further comprising setting a gain value and a delay amount to the second virtual sound source according to a third distance between the second virtual sound source and the speaker.

3. An audio signal processing apparatus comprising:

a speaker that reproduces a reflected sound of a target acoustic space; and an initial reflected sound controller that divides a virtual sound source representing the reflected sound of the target acoustic space into (i) a first virtual sound source located between the speaker and a sound receiving point, the first virtual sound source representing a first sound source of the reflected sound of the target acoustic space, and (ii) a second virtual sound source located such that the speaker is disposed between the second virtual sound source and the sound receiving point, the second virtual sound source representing a second sound source of the reflected sound of the target acoustic space, and, only in a case of the first virtual sound source, moves a position of the first virtual sound source to a reproducible position based on a position of the speaker, wherein the initial reflected sound controller sets a gain value and a delay amount to the first virtual sound source according to a difference between a first distance between the speaker and the sound receiving point and a second distance between the first virtual sound source after movement and the sound receiving point.

4. The audio signal processing apparatus according to claim 3, wherein the initial reflected sound controller sets a gain value and a delay amount to the second virtual sound source according to a third distance between the second virtual sound source and the speaker.

5. A non-transitory computer-readable storage medium storing a program for causing a computer to execute processing comprising:

dividing a virtual sound source representing a reflected sound of a target acoustic space into (i) a first virtual sound source located between a speaker and a sound receiving point, the first virtual sound source representing a first sound source of the reflected sound of the target acoustic space, and (ii) a second virtual sound source located such that the speaker is disposed between the second virtual sound source and the sound receiving point, the second virtual sound source representing a second sound source of the reflected sound of the target acoustic space;

moving, only in a case of the first virtual sound source, a position of the first virtual sound source to a reproducible position based on a position of the speaker; and setting a gain value and a delay amount to the first virtual sound source according to a difference between a first distance between the speaker and the sound receiving point and a second distance between the first virtual sound source after movement and the sound receiving point.

6. The non-transitory computer-readable storage medium according to claim 5, wherein the program further causes the computer to execute processing comprising setting a gain value and a delay amount to the second virtual sound source according to a third distance between the second virtual sound source and the speaker.

* * * * *